United States Patent
Karmon et al.

(10) Patent No.: US 10,139,921 B2
(45) Date of Patent: *Nov. 27, 2018

(54) ELECTRICAL DEVICE FOR HAND GESTURES DETECTION

(71) Applicant: Microsoft Technology Licensing, LLC, Redmond, WA (US)

(72) Inventors: Kfir Karmon, Petach-Tikva (IL); Eyal Krupka, Shimshit (IL); Adi Diamant, Shoham (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,847

(22) Filed: Dec. 27, 2017

(65) Prior Publication Data

US 2018/0120950 A1 May 3, 2018

Related U.S. Application Data

(63) Continuation of application No. 14/985,728, filed on Dec. 31, 2015, now Pat. No. 9,857,881.

(51) Int. Cl.
*G09G 5/00* (2006.01)
*G06F 3/01* (2006.01)
(Continued)

(52) U.S. Cl.
CPC ............ *G06F 3/017* (2013.01); *G06F 3/0304* (2013.01); *G06K 9/00355* (2013.01); *G06K 9/00389* (2013.01)

(58) Field of Classification Search
CPC ... G06F 3/017; G06F 3/0304; G06K 9/00355; G06K 9/0389
See application file for complete search history.

(56) References Cited

U.S. PATENT DOCUMENTS

2014/0050354 A1   2/2014 Heim et al.
2015/0138078 A1   5/2015 Krupka et al.
(Continued)

OTHER PUBLICATIONS

International Search Report and the Written Opinion dated Mar. 31, 2017 From the International Searching Authority Re. Application No. PCT/US2016/068157. (18 Pages).
(Continued)

*Primary Examiner* — Jonathan Boyd

(57) ABSTRACT

Hand gesture detection electrical device for detecting hand gestures, comprising an IC electronically integrating:
(a) First interface connecting to imaging device(s).
(b) Second interface connecting to controlled unit.
(c) Data storage storing sequential logic models representing a hand gestures. The sequential logic models map a sequence of pre-defined hand poses and/or motions.
(d) Memory storing code.
(e) Processor(s) coupled to the first and second interfaces, data storage and memory for executing the code to:
  (1) Receive timed images depicting a user's moving hand.
  (2) Generate a runtime sequence mapping runtime hand datasets each defined by discrete hand values indicating current state of the moving hand.
  (3) Estimate which hand gesture(s) best match the runtime sequence by optimizing the runtime sequence compared to the sequential logic models using SSVM functions.
  (4) Initiate action(s) to the controlled unit. The action(s) are associated with selected hand gesture(s) based on the estimation.

20 Claims, 10 Drawing Sheets

(51) Int. Cl.
*G06F 3/03* (2006.01)
*G06K 9/00* (2006.01)

(56) References Cited

U.S. PATENT DOCUMENTS

2016/0266649 A1  9/2016 Wang et al.
2017/0192513 A1  7/2017 Karmon et al.

OTHER PUBLICATIONS

Official Action dated Jun. 30, 2017 From the US Patent and Trademark Office Re. U.S. Appl. No. 14/985,728. (16 pages).
Bhuyan "FSM-Based Recognition of Dynamic Hand Gestures Via Gesture Summarization Using Key Video Object Planes", World Academy of Science, Engineering and Technology, XP055351262, 6(8): 724-735, Aug. 23, 2012. Abstract, p. 726-730.
Nguyen et al. "Comparisons of Sequence Labeling Algorithms and Extensions", Proceedings of the 24th International Conference on Machine Learning, Corvallis, OR, USA, Jun. 20-24, 2007, XP058231866, p. 681-688, Jun. 20, 2007. Abstract, p. 681, r-h col., Lines 6-19.

ELECTRICAL DEVICE FOR HAND GESTURES DETECTION

RELATED APPLICATIONS

This application is a continuation of U.S. patent application Ser. No. 14/985,728 filed on Dec. 31, 2015, which is related to, U.S. Patent Applications entitled "HAND GESTURE API USING FINITE STATE MACHINE AND GESTURE LANGUAGE DISCRETE VALUES", U.S. patent application Ser. No. 14/985,691, filed on Dec. 31, 2015), "MULTIMODAL INTERACTION USING A STATE MACHINE AND HAND GESTURES DISCRETE VALUES", U.S. patent application Ser. No. 14/985,716, filed on Dec. 31, 2015), "RECOGNITION OF HAND POSES BY CLASSIFICATION USING DISCRETE VALUES", U.S. patent application Ser. No. 14/985,741, filed on Dec. 31, 2015, now U.S. Pat. No. 9,734,435), "TRANSFORM LIGHTWEIGHT SKELETON AND USING INVERSE KINEMATICS TO PRODUCE ARTICULATE SKELETON", U.S. patent application Ser. No. 14/985,777, filed on Dec. 31, 2015), "STRUCTURE AND TRAINING FOR IMAGE CLASSIFICATION", U.S. patent application Ser. No. 14/985,803, filed on Dec. 31, 2015), "TRANSLATION OF GESTURE TO GESTURE CODE DESCRIPTION USING DEPTH CAMERA", U.S. patent application Ser. No. 14/985,804, filed on Dec. 31, 2015), "GESTURES VISUAL BUILDER TOOL", U.S. patent application Ser. No. 14/985,775 filed on Dec. 31, 2015), and "DETECTION OF HAND GESTURES USING GESTURE LANGUAGE DISCRETE VALUES", U.S. patent application Ser. No. 14/985,680, filed on Dec. 31, 2015), the disclosures of which are incorporated herein by reference.

REFERENCES CITED

Materials incorporated by reference in this disclosure include the following:

Eyal Krupka et al., "Discriminative Ferns Ensemble for Hand Pose Recognition".

BACKGROUND

With the evolution of computerized environments, the use of human-machine interfaces (HMI) has dramatically increased. A growing need is identified for more natural human-machine user interface (NUI) methods such as, for example, voice and/or gaze and more specifically for hand gestures interaction to replace and/or complement traditional HMIs such as, for example, keyboards, pointing devices and/or touch interfaces. Doing so may serve to, for example, eliminate and/or reduce the need for intermediator devices (such as keyboard and/or pointing devices), support hands free interaction, improving accessibility to population (s) with disabilities and/or provide a multimodal interaction environment. Current solutions for identifying and/or recognizing hand(s) gestures may exist, however they are mostly immature, present insufficient accuracy and/or high complexity while requiring high computation resources for extensive computer vision processing and/or machine learning. Integration of such solutions into existing and/or new products, systems, platforms and/or environments may present major challenges which may not be easily encountered and may preventing such solution from being adopted for wide scale usage.

SUMMARY

According to some embodiments of the present disclosure, there are provided an electrical device for detecting hand gestures of a user by estimating a runtime sequence of runtime hand datasets through analysis of one or more images depicting movement of hand(s) of a user with respect to a plurality of pre-defined hand gestures to identify the runtime sequence as a valid hand gesture. The pre-defined hand gestures as referred to hereinafter throughout this disclosure refers to pre-defined hand gestures representations which simulate respective hand gestures of a hand(s). In the same manner, definition, creation, construction and/or generation of hand gestures, hand poses and/or hand motions as referred to hereinafter throughout this disclosure refers to definition, creation, construction and/or generation of representations of hand gestures, hand poses and hand motions respectively which simulate respective hand gestures, poses and motions of a hand(s). The electrical device, for example, an integrated circuit (IC), a system on chip (SOC), an application specific integrated circuit (ASIC) and/or an intellectual property (IP) module integrated in a parent IC performs the process of hand gesture detection and may initiate an action, operation and/or command to operate one or more controlled units, for example, a product, an apparatus and/or a system. The controlled unit may be any one/or more devices, apparatuses, systems and/or platforms which may be controlled through hand gesture HMI. Optionally, the electrical device may provide a high level hand gesture indication to one or more host apparatuses, for example, an IC, an ASIC, and SOC, a device and/or a system. The electrical device architecture may be based on hardware and/or a combination of hardware executing software instructions. The electrical device may connect to one or more imaging devices, for example, a camera, a stereo camera, an infrared (IR) camera and/or a depth camera which monitors a moving hand of a user to receive one or more timed images depicting the moving hand. The electrical device may connect to the one or more camera units, controlled unit(s) and or the host apparatuses over one or more interfaces, for example, printed circuit board (PCB) traces, a wired interface and/or a wireless interface. The electrical device may integrate the necessary hardware components (units) required to perform the hand gesture detection such as, for example, one or more processors, volatile memory arrays, non-volatile memory arrays and/or dedicated hardware units, such as for example, a vector processing unit. Optionally, the electrical device integrates one or more of the imaging device. Detection of the hand gestures is based on a discrete architecture for representing the hand gestures in which each of the hand gestures includes one or more hand poses and/or hand motions each represented by a hand features record. Each of the hand features records is defined through one or more of a plurality of discreet hand values. Each of the discrete hand values indicates a value of a corresponding hand feature (characteristic), for example, hand pose, finger(s) flexion, hand motion and/or finger(s) motion of the hand. Continuous values of the one or more hand features may be represented by discrete hand values by quantizing the continuous values to support the discrete architecture of the hand gesture detection process. The hand gestures detection is performed in several stages. The first stage is to generate a runtime sequence of one or more runtime hand datasets each defined by a plurality of discrete hand values scores inferred from the moving hand by analyzing the one or more timed images using trained statistical classification functions (classifiers). In the second stage, using one or more SSVM functions the runtime hand datasets are matched against a plurality of one or more sequential logic models each portraying a hand representing one of the plurality of hand gestures to produce estimation terms. The one or more sequential logic models of the hand gestures may be represented by a finite state machine (FSM) documenting transitions between hand pose(s) and/or hand motion(s). At the next stage, an optimization process may be executed by the electrical device in which an optimal hand gesture of the plurality of hand gestures is selected by resolving a weighted calculation using the estimation terms over the runtime hand datasets to identify the optimal hand gesture that best describes the depicted runtime sequence. The optimization may be done through dynamic programming using, for example, viterbi decoding after augmenting the hand gestures FSM with one or more score functions over one or more sequences within the FSM.

Using the electrical device to detect the hand gestures may present major advantages with respect to integration of gesture detection capabilities in existing and/or new high level devices, products, systems platforms and/or solutions. By directly controlling a controlled unit and/or providing a high level indication of the detected hand gestures the full advantage of hand gesture interaction is achieved with no need for the high level devices, products, systems platforms and/or solutions to get involved with the detection process itself. The electrical device may enable the hand gesture HMI for a plurality of products, applications and systems, for example, internet of things (IOT), smart home, gaming, learning, medical, sports appliances, automotive, customer service, smart conferencing, industrial applications and the likes.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
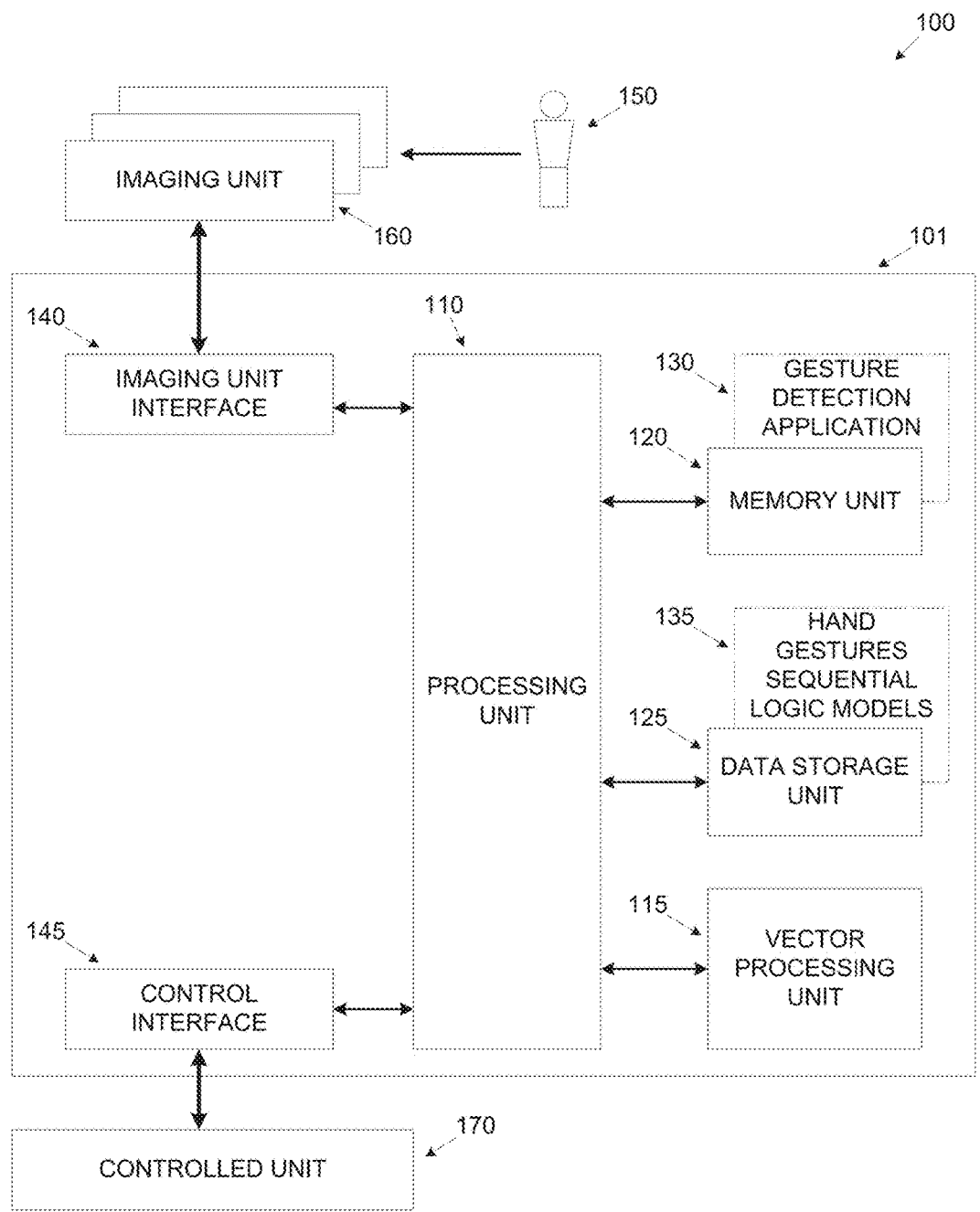
FIG. 1 is a schematic illustration of an exemplary electrical device for detecting a hand gesture depicted by an image(s), according to some embodiments of the present disclosure.

According to some embodiments of the present disclosure, there is provided an electrical device for detecting hand gestures of a user by estimating a runtime sequence of one or more runtime hand datasets through analysis of one or more images depicting movement of hand(s) of a user with respect to a plurality of pre-defined hand gestures to identify the runtime sequence and/or parts thereof as a valid hand gesture. The electrical device, for example, an IC, an SOC, an ASIC and/or an IP module integrated in another IC may perform the process of hand gesture detection and may initiate an action, operation and/or command to operate one or more controlled units, for example, a product, an apparatus and/or a system. The controlled unit may be any one/or more devices, apparatuses, systems and/or platforms which may be controlled through hand gesture HMI. Optionally, the electrical device may provide a high level hand gesture indication to a host apparatus such as, for example, an IC, an ASIC, and SOC, a device and/or a system. The electrical device may be hardware based and/or employ a hardware/software combination in which a hardware module executes software instructions. The electrical device may connect to one or more imaging devices, for example, a camera, a stereo camera, an IR camera and/or a depth camera which monitors a moving hand of a user to receive one or more timed images depicting the moving hand. The electrical device may connect to the one or more controlled units and/or host apparatuses over one or more interfaces, for example, IC internal interconnections, PCB traces, a wired interface, and/or a wireless interface. The wired interface may utilize, for example, universal serial bus (USB), local area network (LAN), fire wire and the likes. The wireless interface may utilize, for example, wireless LAN (WLAN), Bluetooth, Bluetooth low energy (BLE), near field communication (NFC), IR and the likes. When implemented as an IP module integrated in a parent IC where the controlled unit and/or the host apparatus may be another module(s) integrated in the parent IC, the electrical device may interconnect with the host apparatus module over one or more internal interconnects of the parent IC. When implemented as an IC on a PCB with the controlled unit and/or the host apparatus being another IC on the same PCB, interconnection between the electrical device and the controlled unit and/or the host apparatus may be utilized through PCB traces. The electrical device may integrate the necessary hardware components (units) required to perform the hand gesture detection such as, for example, one or more processors, volatile memory arrays, non-volatile memory arrays and/or dedicated hardware units, such as for example, a vector processing unit. Optionally, the electrical device integrates one or more of the imaging device. Detection of the one or more hand gestures performed by the user and depicted in the one or more images is based on a discrete architecture in which discrete hand values serve as building blocks to define hand poses and/or hand motions constituting hand gestures. The one or more images may be timed and/or synchronized to maintain a runtime sequence of the depicted moving hand gesture(s). Each hand gesture may include one or more hand poses and/or hand motions each represented as a pre-defined hand features record which may be a hand pose features record or a hand motion features record respectively. The hand features records are each defined by a unique set of discrete hand values each indicating a state of a corresponding one of a plurality of hand features (characteristics) of the depicted hand such as, for example, various finger and/or hand states and/or motions. The hand features include pose features and motion features each associated with one or more discrete pose values and discrete motion values respectively. Each of the pre-defined hand gestures may be represented as sequential logic model comprising one or more hand poses and/or hand motions which are each represented by a hand features record which are in turn defined through a plurality of discrete hand values. In the same manner each of the one or more images capturing the one or more runtime hand datasets constituting the runtime sequence of hand movements of the user are analyzed to identify it as a hand pose or a hand motion and further infer one or more of discrete hand values from which each runtime hand dataset is constructed. The discrete hand values identified for each of the runtime hand datasets are referred to as discrete hand values scores and may include discrete pose values and/or discrete motion values each indicating a current (runtime) value of a corresponding one of the plurality of hand features. Continuous values of the one or more hand features may be represented by discrete hand values by quantizing the continuous values to support the discrete architecture of the hand gesture detection process. Since the pre-defined hand poses and/or hand motions as well as the runtime hand datasets are defined through a plurality of discrete hand values, estimation of the runtime sequence as one of the pre-defined hand gestures is basically an optimization problem in which an optimal pre-defined hand gesture best describing the runtime sequence is selected. Each of the one or more runtime hand datasets is submitted to one or more SSVM functions together with one or more of the pre-defined hand features records to generate a plurality of estimation terms for the runtime hand dataset with respect to each of the pre-defined hand features records. The estimation terms include singleton terms and pairwise terms. The singleton terms define a correlation between each of the runtime hand datasets and one of the pre-defined hand features records. The pairwise terms define a correlation between each of the runtime hand datasets and a two (current and predecessor) of the pre-defined hand features records. The runtime sequence may then be estimated to comply as one of the pre-defined hand gestures by resolving an optimal matching pre-defined hand features record for each of the one or more runtime hand datasets. The singleton and/or pairwise terms may be generated by simulating the discrete hand values of the pre-defined hand poses and/or hand motions over the discrete hand values scores of each of the runtime hand datasets. The pre-defined hand features records may be represented in a binary form, for example, conjunctive normal form (CNF). The one or more SSVM functions may apply one or more parametric functions to generate the singleton terms and/or the pairwise terms. The one or more SSVM functions may be trained offline to identify the most accurate estimation terms to be associated with each of the pre-defined hand features records. Each of the one or more sequential logic models defining the one or more hand gestures may be represented by an FSM in which each hand features record (hand pose or hand motion) is a state and the FSM documents transitions between the hand pose(s) and/or hand motion(s). Prior to initiating the optimization process, the FSM representing the one or more pre-defined hand gestures may be augmented with one or more score functions over sequences within the FSM in order to allow for an efficient and accurate optimization, each of the one or more sequences within the FSM representing a hand gesture. The optimization process may be performed through dynamic programming which may utilize, for example, viterbi decoding over the one or more score functions using the generated singleton terms and/or the pairwise terms. Once complete, the optimization process yields an optimal pre-defined hand gesture which best matches the runtime sequence of movements of the hand of the user as depicted in the one or more images. Optionally one or more weights are assigned to each of the estimation terms to improve the optimization process. The one or more weights may be calculated by for example, one or more SSVM functions which may be trained to select the best matching weights for each of the pre-defined hand features records. Optionally, the runtime sequence may be estimated as a sequential logic model of a hand gesture which is not pre-defined but is rather possible to construct using the discrete architecture discrete hand values each indicating a value of a corresponding one of the hand features. Optionally, the one or more SSVM functions are specialized top identify the runtime sequence as one of a plurality of registered hand gestures. The one or more registered hand gestures may be registered based on a context of an activity of the user, for example, one or more of the pre-defined hand gestures may be registered (associated) with a specific application. In the event the specific application is active during the detection of the user hand movement as depicted in the runtime sequence, only the registered hand gestures are considered by the optimization process for selecting the optimal hand gesture best matching the runtime sequence.

Inferring the discrete hand values scores to create the one or more runtime hand datasets constituting the runtime sequence is done through a classification process of the one or more hand poses and/or hand motions by applying trained classifying functions which match the plurality of discrete hand values extracted from the captured image(s) with corresponding discrete values optimized during a training session. Prior to classification of the hand poses and/or hand motions one or more adjustments and/or manipulations may be performed on the captured image(s) to align the visual representation of the moving hand captured in the image(s) with the capturing conditions which were used during the training session. The one or more adjustments and/or manipulations may also utilize classification using trained classifying functions. The one or more adjustments to the image(s) depicting the moving hand may include, for example, removal of non-relevant portions of the image, scaling and/or alignment. The initial step may be estimating the center of mass of the hand depicted in the image(s) to identify a relevant image segment which may be processed during the classification process. The center of mass estimation may be followed by fine tune analysis to estimate the center of the hand. Based on image data available within the received image(s), the image(s) may be further manipulated to remove elements which are irrelevant to the depicted hand, such as for example, background static elements (which may be identified through comparison of successive images) and/or pixels which are at a certain absolute and/or relative distance from the depicted hand where the distance may be set according to threshold value. The image data available within the received image(s) may be, for example depth data and/or IR data. Removing the irrelevant data from the image(s) may improve the classification processes analyses. The discrete hand values architecture is the basis for classification process in which during each of the classification steps a plurality of trained classifying functions (classifiers) are applied to the image(s) segment to solve and/or classify one or more states of the moving hand are solved. Continuous values of the one or more hand pose features, for example, hand 3D spatial position and/or finger(s) to palm relative angle(s), may be represented by discrete hand values by quantizing the continuous values to support the discrete architecture of the classifying functions. Multi-class classification and/or multiple binary classifying functions may be trained using one classifying function versus other one or more classifying functions. During the training session the classifying functions providing the highest accuracy are selected. The classifying functions include, for example, hand 3 dimensional (3D) spatial rotation, hand alignment and/or a plurality of hand pose features, for example, hand location, fingers flexion, fingers direction, fingers tangency and/or fingers relative location. The 3D spatial rotation of the hand may be estimated in two stages by first identifying a global orientation category (GOC) which represents rotation that cannot be compensated for with respect to a two-dimensional (2D) plane of the imaging device(s), followed by identifying an in-plane rotation which defines the rotation of the hand within 2D plane of the imaging device. For each of the classification process steps a dedicated set of classifying functions is used. The classification process creates a discrete skeletal representation of the hand by producing a runtime dataset containing a plurality of discrete hand values scores each corresponding to one of the hand features of the moving hand. The sets of classifying functions are trained during a training session in which a plurality of training datasets, for example, image(s) of a plurality of hand pose and/or motions by one or more users and/or a plurality of hand pose(s) and/or motions models is driven to the classifying functions and a class label is assigned to each of them. The classifying functions may employ statistical processing, for example, regression analysis and/or use of a plurality of discriminative fern ensembles (DFE). Each of the plurality of DFE classifiers includes one or more tables of discrete hand values which are associated with one of the hand features collected and classified during the training process using the training data. The DFE tables hold weight values which are matched to the image segment on pixel-by-pixel base and the contents of the image segment is classified according to the matching results. The DFE classifiers (each associated with one of the hand pose features) may be stacked and/or concatenated to enlarge the DFE structure and increase the number of classifying functions. Stacking and/or concatenated the DFE classifiers may improve the accuracy of the classification of the hand pose depicted by the image(s) segment. Further detailed description of creating, training and/or using DFE architecture for hand pose recognition is described in publication "Discriminative Ferns Ensemble for Hand Pose Recognition" by Eyal Krupka et al., whose disclosure is incorporated herein by reference. Optionally, the classifying functions used for, for example, the hand 3 dimensional (3D) spatial rotation, the hand alignment and/or the plurality of hand features (pose and motion) employ trained discriminative tree ensembles (DTE) also referred to herein as "long tree" and/or a combination of DFEs and "long tree". Further detailed description of creating, training and/or using and/or a combination of DFEs and "long tree" architecture for hand pose and/or motion recognition is described in US Application Patent Applications entitled "Structure and Training for Image Classification", whose disclosure is incorporated herein by reference. Optionally trajectory analysis is applied to identify one or more of a plurality of discrete hand values scores to represent a motion and/or a part of the motion. The trajectory analysis may be based on a plurality of training data for characterizing hand features which are common at least some of a plurality of users.

Providing an electrical device which performs the complete hand gesture detection of the user and directly controls one or more controlled units and/or provides a host with a high level indication of the hand gesture that was performed by the user may dramatically reduce the integration effort to introduce and/or integrate hand gestures interaction to products, systems, platforms and/or solutions. The electrical device relieves the hosting device, apparatus, product, system and/or platform from any tasks involved in detecting the hand gestures of the user, specifically, computer vision processing computer learning and computation load related to classification and/or recognition of the hand gestures. Introducing the hand gesture detection electrical device may ease and/or simplify integration of the hand gestures HMI which may become highly accessible promoting it to be used on a large scale for a plurality of applications. The electrical device may serve as an enabling means to turn the hand gesture HMI into a common and wide spread HMI for controlling and/or interacting with a plurality of products, applications and systems, for example, TOT, smart home, gaming, learning, sports appliances, automotive, medical, customer services, smart conferencing, industrial applications and the likes.

Furthermore the hand gesture detection method which is based on the discrete nature of the hand gestures representation for estimating and/or recognizing the one or more hand gestures of the user as depicted in the image(s) may dramatically reduce the required computation load needed for computer vision processing, image processing and/or machine learning in runtime. As each of the one or more hand gestures is defined by a finite number of possible values, for example 5, 10 and/or 20 may be valid for each hand feature avoiding the need to fully model the hand skeleton and/or employ intensive computer vision processing. Reducing the computation load needed for, for example, computer vision processing, image processing and/or machine learning may thus reduce the electrical device's power consumption, complexity and/or cost.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring now to the drawings, FIG. 1 is a schematic illustration of an exemplary electrical device for detecting a hand gesture depicted by an image(s), according to some embodiments of the present disclosure. Illustration 100 presents an exemplary electrical device 101 for detecting hand gestures of a user by estimating a runtime sequence of one or more runtime hand datasets through analysis of one or more images depicting a moving hand of a user with respect to a plurality of pre-defined hand gestures to identify the runtime sequence and/or parts thereof as a valid hand gesture. Optionally, the hand gestures to which the runtime hand datasets are compared to determine a match are not pre-defined gestures but are rather combinations of one or more pose features records and/or hand motion features records. The electrical device 101, for example, an IC, an SOC, an ASIC and/or an IP module integrated in another IC may perform the process of hand gesture detection and may provide a high level hand gesture indication to a host apparatus such as, for example, an IC, an ASIC, and SOC, a device and/or a system. The electrical device 101 includes an imaging unit interface 140 for connecting to one or more imaging units 160, for example, a camera, a stereo camera, an IR camera and/or a depth camera which monitors a moving hand of a user 150 to receive one or more timed images depicting the moving hand. The electrical device 101 includes a control interface 145 for connecting to one or more controlled units 170, for example, device, product, system and/or platform. Since the electrical device 101 may be implemented in different forms, the imaging unit interface 140 and/or the control interface 145 may utilize one or more different infrastructures and/or protocols. In case the electrical device 101 is a stand-alone electrical device the imaging unit interface 140 and/or the control interface 145 may be wired and/or wireless interfaces, for example, USB, LAN, fire-wire, WLAN, Bluetooth, BLE, NFC, IR and the likes. As the electrical device 101 may be implemented as an IP module integrated in an IC where the imaging unit(s) 160 and/or the controlled unit 170 are another modules integrated in the same IC, the imaging unit interface 140 and/or the control interface 145 may interconnect with the imaging unit(s) 160 and/or the controlled unit 170 over internal interconnects of the IC. Optionally the electrical device 101 is available as a hard and/or soft IP module which may be synthesized and/or integrated into for example, an IC, an ASIC and/or an SOC using very large scale integration (VLSI) process integration tools and/or hardware description languages (HDL), such as for example, Verilog and/or Very High Speed Integrated Circuit (VHSIC) hardware description language (VHDL). When utilized as an electrical device assembled on a PCB with the controlled unit 170 and/or the imaging units(s) 160 being another electrical devices on the same PCB the electrical device 101 may interconnect with the imaging unit(s) 160 and/or the controlled unit 170 electrical devices through PCB traces. Optionally, the electrical device 101 integrates one or more units (modules and/or components) required to perform the hand gesture detection such as, for example, a processor 110, a volatile memory unit 120, a non-volatile data storage unit 125 and/or dedicated hardware units, such as for example, a vector processing unit 115. The one or more vector processing units 115 may support the electrical device 101 with processing the one or more images received from the one or more imaging units 160. Optionally, the electrical device 101 integrates one or more of the imaging device 160 in it. Optionally, the memory unit 120 and/or the data storage unit 125 are external to the electrical device 101 and are accessible through one or more of the imaging unit interface 140, the control interface 145 and/or one or more additional interfaces available in the electrical device 101. The data storage unit 125 may store a gesture detection application 130 and/or a plurality of sequential logic models 135 each representing one of a plurality of hand gestures. The processor 110 may execute the program code 145 from the data storage unit 125 and/or from the memory unit 120 to estimate which of the plurality of hand gestures is identified in the timed image(s) depicting the moving hand. At the detection of one or more hand gestures which are associated with one or more actions, operations and/or commands, the electrical device 101 may initiate the one or more associated actions to the controlled unit 170 over the control interface 145. Optionally, the gesture detection application 130 and/or the plurality of sequential logic models 135 are fetched from outside the electrical device 101, for example, received from the host apparatus 170. Optionally, the gesture detection application 130 and/or the plurality of sequential logic models 135 are updated in the data storage unit 125 through an update session controlled by the processor 110 and/or by the host apparatus 170. Optionally, the electrical device 101 connects to a host apparatus though, for example the control interface 145 to provide the host apparatus a high level indication of the detected one or more hand gestures, for example transmitting a message, sending a description and/or indicting a pointer to identify the one or more hand gestures that were detected in the hand movements of the user 150.

Figure 2:
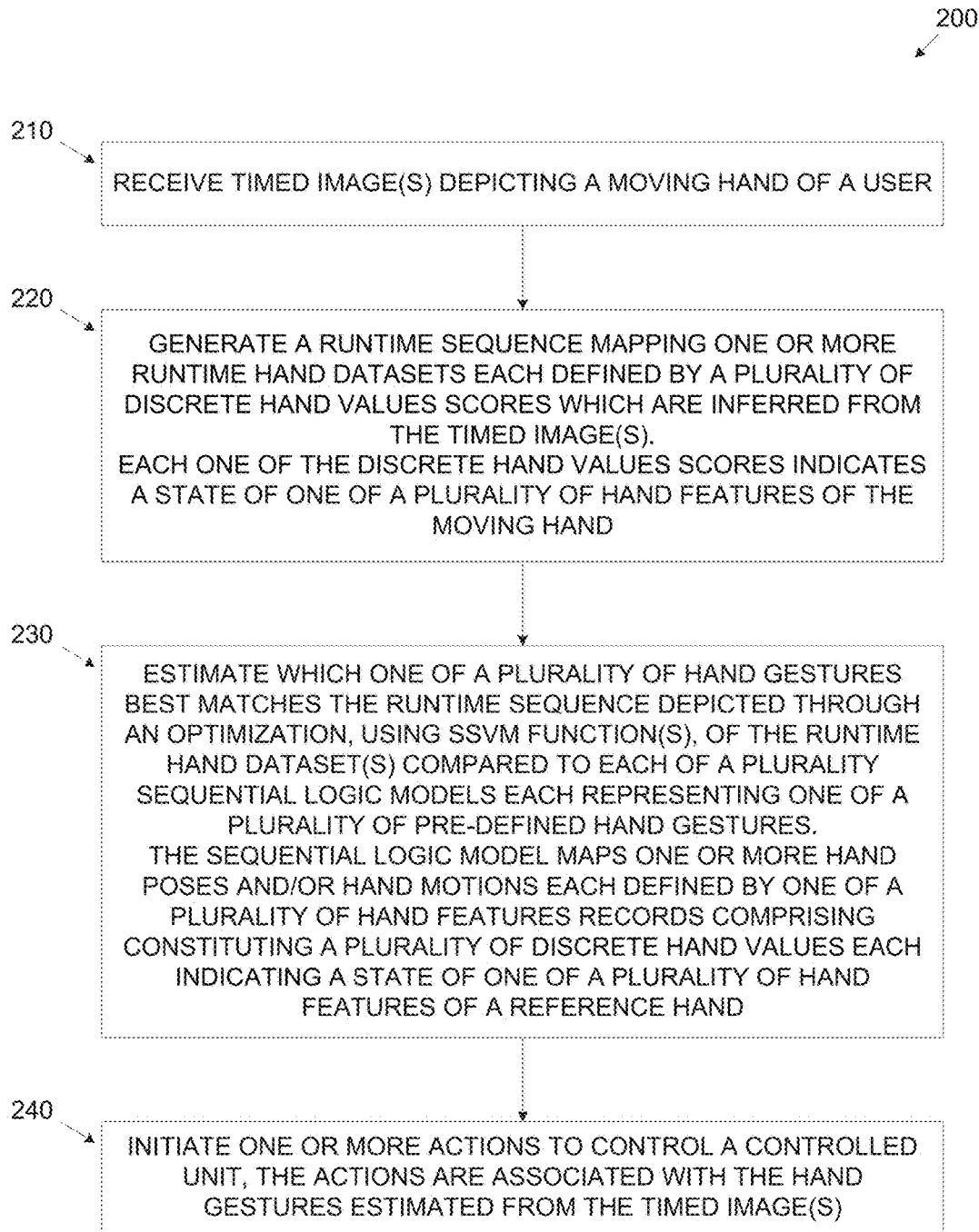
FIG. 2 is a flowchart of an exemplary process executed on an exemplary electrical device for detecting a hand gesture depicted by an image(s), according to some embodiments of the present disclosure.

Referring now to the drawings, FIG. 2 is a flowchart of an exemplary process for detecting a hand gesture depicted by an image(s), according to some embodiments of the present disclosure. An exemplary hand gesture detection process 200 which may be performed by an electrical device such as the electrical device 101 executing a gesture detection application such as the gesture detection application 130 presents a detection process of movements of a moving hand of a user such as the user 150 depicted in one or more images. As shown at 210, the hand gesture detection process 200 starts with receiving one or more timed images from an imaging unit such as the imaging unit 160. The timed image(s) may have time stamping and/or be otherwise synchronized to maintain a synchronized runtime sequence of the movement(s) of the moving hand.

Before further describing the hand gesture detection process 200 executed on the electrical device 101 it is important to understand the discrete architecture used for defining hand gestures, hand poses and/or hand motions. The discrete hand features defining the hand features records as well as the discrete hand features scores defining the runtime hand datasets all refer to the same discrete hand values as presented herein. The discrete hand values may be discrete pose values or discrete motion values. Continuous values of the one or more hand features may be represented by discrete hand values by quantizing the continuous values to support the discrete architecture of the hand gesture detection process.

Figure 3:
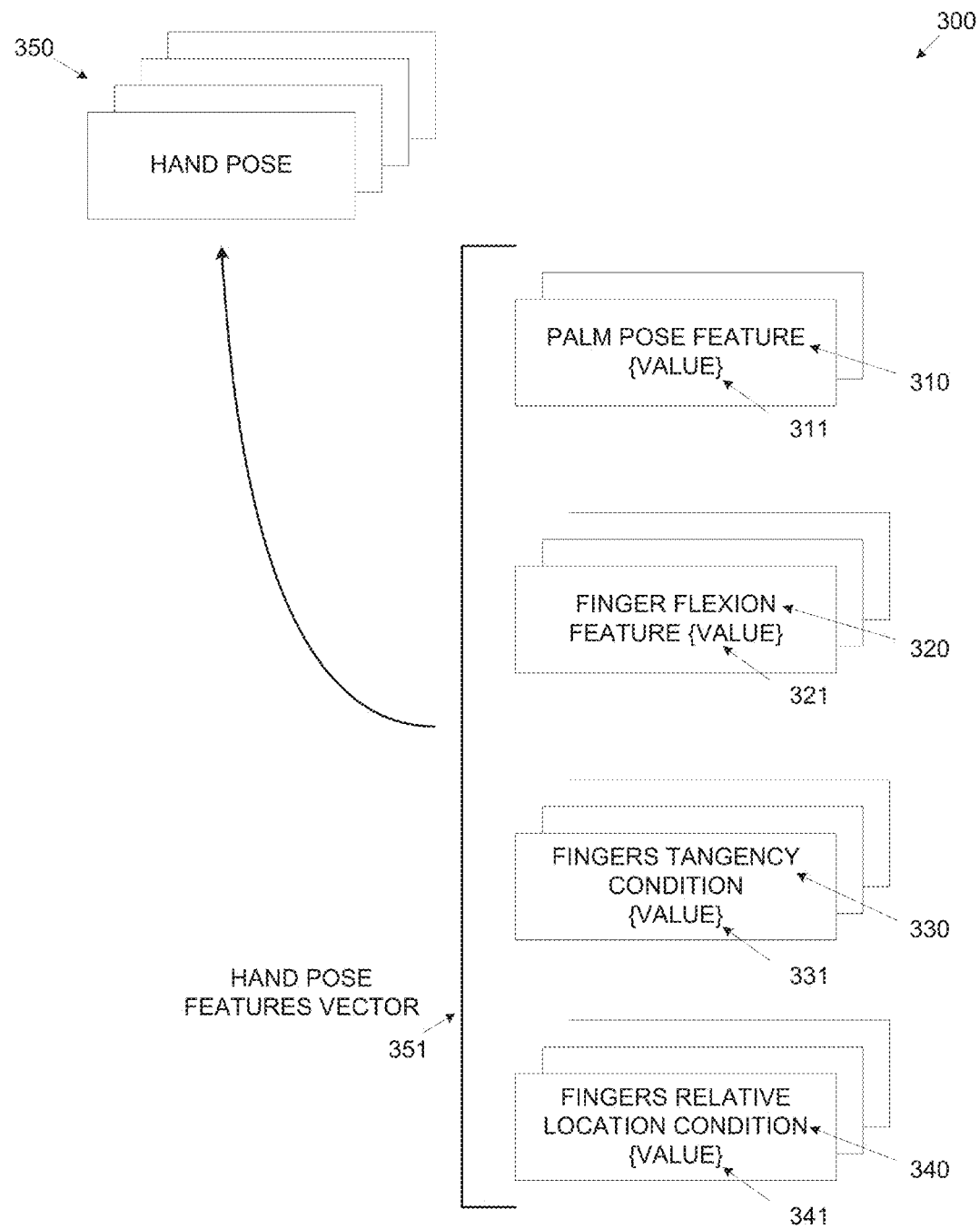
FIG. 3 is a schematic illustration of exemplary hand poses discrete representation, according to some embodiments of the present disclosure.

Reference is now made to FIG. 3 which is a schematic illustration of exemplary hand poses discrete representation, according to some embodiments of the present disclosure. Illustration 300 depicts exemplary hand poses 350 representation as a hand pose features record 351 which includes one or more hand pose features 310, 320, 330 and 340. The hand pose features records 351 which was referenced within the generalized term of hand features record may be represented with one or more of the discrete pose value 311, 321, 331 and/or 341 each indicating a state (value) of the respective hand pose feature 310, 320, 330 and/or 340 for an associated hand pose of the hand poses 350. Continuous values of the one or more hand pose features 310, 320, 330 and/or 340 may be represented by the discrete pose values 311, 321, 331 and/or 341 by quantizing the continuous values. The combination of the one or more discrete pose values 311, 321, 331 and/or 341 of the respective hand pose features 310, 320, 330 and 340 as defined by the hand pose features record 351 identifies a specific pose of the hand poses 350 which may be detected by analyzing one or more images depicting movement of a hand(s) of a user such as the user 150. The hand pose features record 351 may be represented as, for example, a features vector, a features matrix and/or a features table. The hand pose features record 351 may include values of one or more of the following exemplary hand pose features:

- Palm pose features—one or more palm pose features 310 include, for example, hand selection, palm direction, palm rotation and/or hand location. Hand selection may identify which hand is active and may include discrete pose values 311 such as, for example, right, left, both and/or any. Palm direction may define the direction in which the palm of the active hand is facing and may include discrete pose values 311 such as, for example, left, right, up, down, forward and/or backward. Palm rotation may define the rotation state of the palm of the active hand and may include discrete pose values 311 such as, for example, left, right, up, down, forward and/or backward. Hand location may identify the spatial location of the active hand in space and may include discrete pose values 311 such as, center of field of view (FOV), right side of FOV, left side of FOV, top of FOV, bottom of FOV, front of FOV and/or rear of FOV. Where FOV is for example, the visible space of an imaging device monitoring the movement of the hand of the user 150. Optionally, hand location is identified with respect to a fixed object present in the FOV, for example, keyboard and/or pointing device so that hand location may be defined by discrete pose values 311 such as, for example, above_keyboard, behind_keyboard, right_of_keyboard and/or left_of_keyboard.
- Finger flexion features 13 one or more finger flexion features 320 which are defined per finger. For example, a finger feature 320 may be a flexion and/or curve state which may include discrete pose values 321 such as, for example stretched, folded and/or open represented, for example by 0, 1, and 2. Each finger (thumb, index, middle, ring and/or pinky) is assigned one or more specific finger features, for example, {thumb, middle, ring, pinky} in {folded} state and {index} in {stretched} state.
- Finger tangency condition features—one or more fingers tangency features 330 which are defined per finger. The tangency feature may define a touch condition of any two or more fingers and/or touch type and may include discrete pose values 331 such as, for example, not touching, fingertip and/or full touch.
- Finger relative location condition features—one or more fingers relative location features 340 are defined per finger. Each of the finger relative location condition features 340 may define a relative location of one finger in relation to another. The fingers relative location features 340 may include discrete pose values 341 such as, for example, one or more fingers are located relatively to another one or more fingers to the left, right, above, below, inward, outward, in front and/or behind.

Each one of the hand poses 350 is defined by a unique one of the hand pose features records 351 which may be a combination and/or sequence of one or more discrete pose values 311, 321, 331 and/or 341 each indicating a value of the corresponding hand pose feature 310, 320, 330 and/or 340. The hand pose features records 351 may include only some (and not all) of the discrete pose values 311, 321, 331 and/or 341 while other discrete pose values 311, 321, 331 and/or 341 which are not included are left free. For example, the hand pose features records 351 may define a specific state of the fingers (for example discrete pose values 321, 331 and/or 341) while the direction of the palm is left unspecified (for example discrete pose value 311). In this case the hand pose 350 is detected in runtime by identification of the fingers state as defined by the hand pose features records 351 with the hand facing any direction. Detection of the one or more hand poses 350 is simplified since the discrete pose values 311, 321, 331 and/or 341 may be easily identified because there is a finite, limited number of possible states for each of the hand pose features 310, 320, 330 and/or 340 avoiding the need for hand skeleton modeling thus reducing the level of computer vision processing. The discrete representation of the hand pose features 310, 320, 330 and/or 340 may not be limited to discrete values only. Continuous values of the one or more hand features 310, 320, 330 and/or 340 may be represented by discrete pose values 311, 321, 331 and/or 341 respectively by quantizing the continuous values. For example, the palm rotation palm pose feature 310 may be defined with 8 discrete values 311A-311F-0°, 45°, 90°, 135°, 180°, 225°, 270° and 315° to quantize the complete rotation range of 0°-360°.

Figure 4:
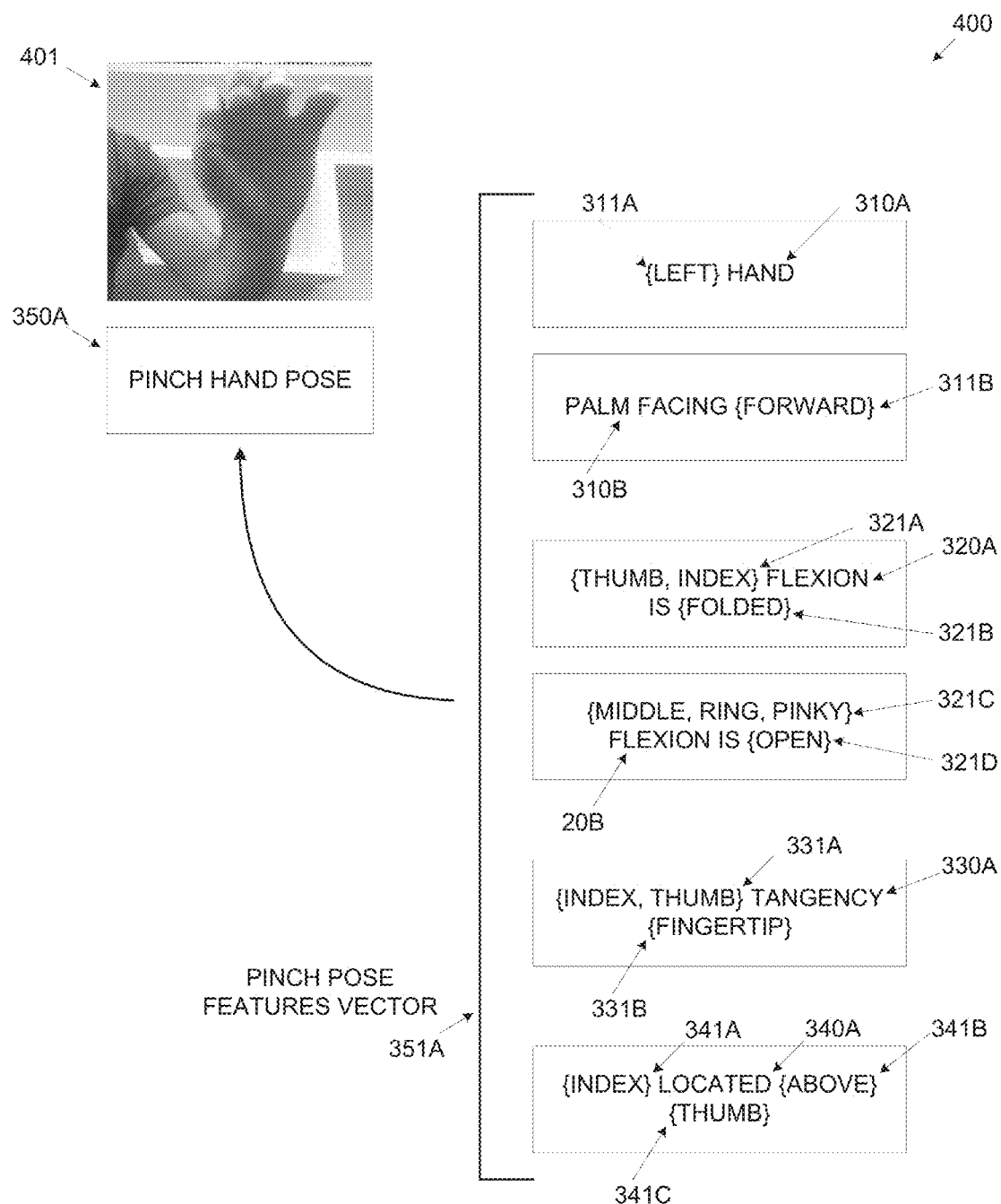
FIG. 4 is a schematic illustration of an exemplary pinch hand pose discrete representation, according to some embodiments of the present disclosure.

Reference is now made to FIG. 4 which is a schematic illustration of an exemplary pinch hand pose discrete representation, according to some embodiments of the present disclosure. Illustration 400 depicts an exemplary pinch hand pose 350A representation by a pinch pose features record 351A comprising discrete pose values such as the discrete pose values 311, 321, 331 and/or 341, each indicating a value of a corresponding pose feature such as the pose features 310, 320, 330 and/or 340. The pinch hand pose 350A which is visualized through an image capture 401 is defined by some of the plurality of discrete pose values 311, 321, 331 and 341 as follows:

- A hand selection feature 310A is assigned a discrete pose value 311A to indicate the left hand is active.
- A palm direction feature 310B is assigned a discrete pose value 311B to indicate the palm of the active hand is facing forward.
- A fingers flexion feature 320A is assigned a discrete pose value 321A and a discrete flexion value 321B to indicate the thumb and index fingers are folded.
- A fingers flexion feature 320B is assigned a discrete pose value 321C and a discrete pose value 321D to indicate the middle, ring and pinky fingers are open.
- A fingers tangency condition feature 330A is assigned a discrete pose value 331A to indicate the thumb and index fingers are touching at their tips.
- A fingers relative location feature 340A is assigned a discrete pose value 341A, a discrete pose value 341B and a discrete pose value 341C to indicate the index finger is located above the thumb finger.

As seen above, the pinch hand pose 350A is uniquely defined by a pinch features pose features record 351A comprising the discrete pose values 311A, 311B, 321A, 321B, 321C, 321D, 331A, 331B, 341A, 341B and 341C corresponding to the pose features 310A, 310B, 320A, 320B, 330A and 340A respectively. Similarly additional hand poses 350 may be defined.

Figure 5:
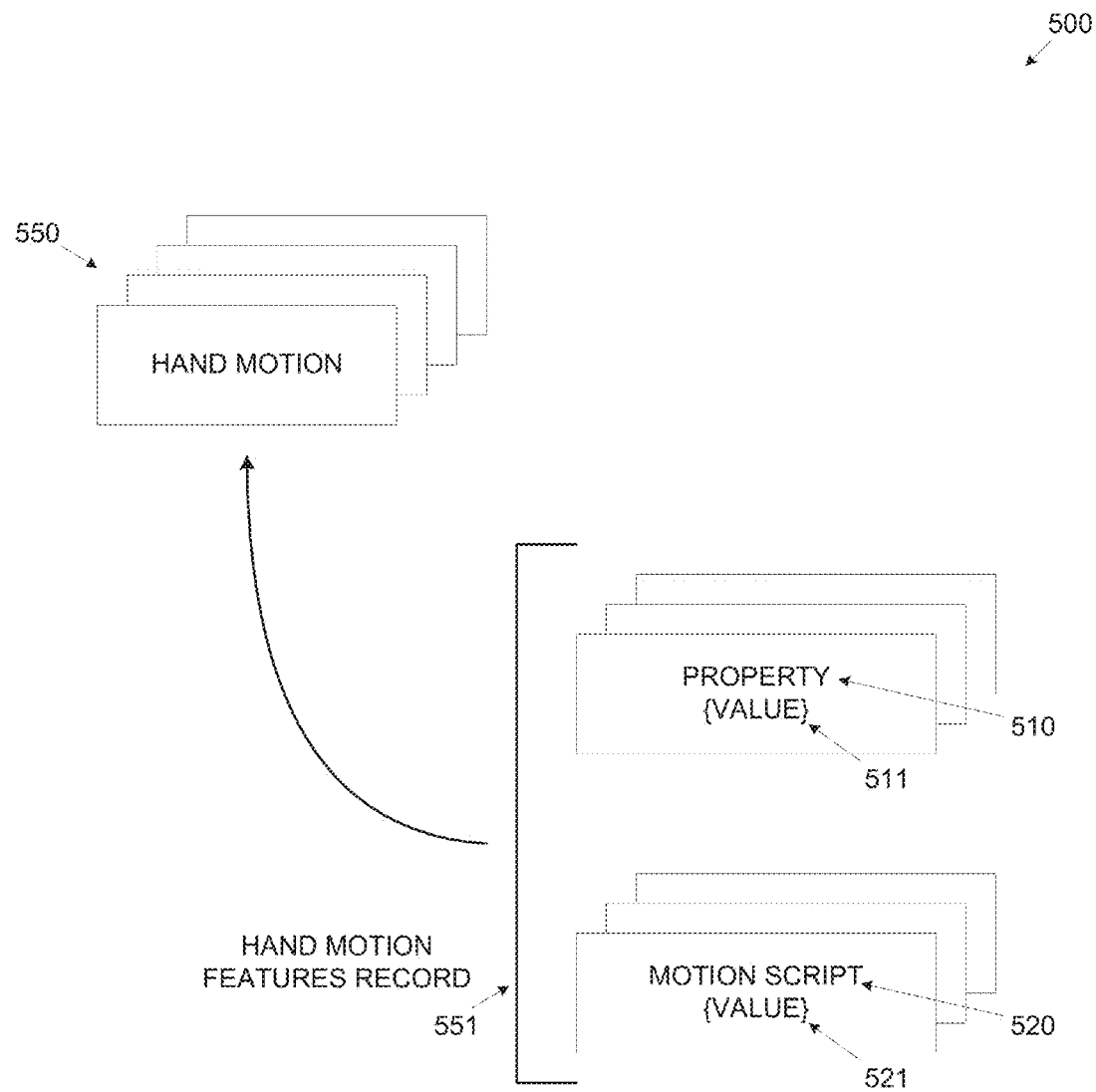
FIG. 5 is a schematic illustration of exemplary hand motions discrete representation, according to some embodiments of the present disclosure.

Reference is now made to FIG. 5 which is a schematic illustration of exemplary hand motions discrete representation, according to some embodiments of the present disclosure. Illustration 500 depicts each of a plurality of exemplary hand motions 550 representation as a hand motion features record 551. The hand motion features record 551 which was referenced within the generalized term of hand features record may include one or more hand motion features 510 and 520. Each of the hand motion features 510 and 520 may be assigned with one or more discrete motion values 511 and/or 521 which indicate a state (value) of the respective motion feature 510 and/or 520 for an associated hand motion of the hand motions 550. Continuous values of the one or more hand motion features 510 and/or 520 may be represented by the discrete motion values 511 and/or 521 by quantizing the continuous values. The hand motion features record 551 identifies a specific motion of a hand and/or finger(s) which may be detected by analyzing one or more images depicting movement of a hand(s) of a user such as the user 150. The hand motion features record 551 may be represented as, for example, a features vector, a features matrix and/or a features table. The hand motion features record 551 may include one or more of the following exemplary hand motion features:

Motion property features—one or more motion property features 510 may include, for example, motion size, motion speed and/or motion location. Motion size may identify the size (scope) of the motion, and may include discrete motion values 511 such as, for example, small, normal and/or large. Motion speed may define the speed of the motion and may include discrete motion values 511 such as, for example, slow, normal, fast and/or abrupt. Motion location may identify the spatial location in which the motion is performed, and may include discrete motion values 611 such as, for example, center of FOV, right side of FOV, left side of FOV, top of FOV, bottom of FOV, front of FOV and/or rear of FOV. Optionally, the hand location is identified with respect to a fixed object present in the FOV, for example, keyboard and/or pointing device so that hand location may include discrete motion values 611 such as, for example, above_keyboard, behind_keyboard, right_of_keyboard and/or left_of_keyboard.

Motion script features—one or more motion script features 520 may define the actual motion performed. The motion script values 520 may include, for example, motion direction, motion start point, motion end point and/or pre-defined curve shapes. The motion direction feature 520 may include discreet motion values 521 such as, for example, upward, downward, left_to_right, right_to_left, diagonal_left_upward, diagonal_right_upward, diagonal_left_downward, diagonal_right_downward, clockwise_arc_right_upward, clockwise_arc_right_downward, clockwise_arc_left_upward, clockwise_arc_left_downward, counter_clockwise_arc_right_upward, counter_clockwise_arc_right_downward, counter_clockwise_arc_left_upward and/or counter_clockwise_arc_left_downward. Optionally, the motion curve shapes may include for example, at-sign (@), infinity sign (∞), digit signs, alphabet signs and the likes. Optionally, additional one or more curve shapes, for example, checkmark, bill request and the likes may be defined by the hand motion features record 551. Each of the motion script features 520 is defined for a two dimensional (2D) plane, however each of the motion script features 520 may be transposed to depict another 2D plane, for example, X-Y, X-Z and/or Y-Z. Optionally, the motion script features 520 define three dimensional (3D) motions and/or curves using a 3D image data representation format.

Each one of the hand motions 550 is defined by a unique one of the hand motion features records 551 which may a combination and/or sequence of one or more discrete motion values 511 and/or 521 each indicating a value of the corresponding hand motion feature 510 and/or 520. Using the discrete motion values 521 and/or 521 allows for simple detection of the hand motions 550 as there are a finite number of discrete motion values 511 and/or 521 to be analyzed and estimated avoiding the need for full hand skeleton modeling thus reducing the level of computer vision processing. For instance the motion speed feature included in the hand motion property feature 510 may include up to four discrete motion values 511—slow, normal, fast and abrupt. Similarly additional hand motions 550 may be defined. The discrete representation of the hand motion features 510 and/or 520 may not be limited to discrete values only, continuous values of the one or more hand motion features 510 and/or 520 may be represented by discrete motion values 511 and/or 521 respectively by quantizing the continuous values. For example, the motion speed property feature 511 may be defined with 6 discrete motion values 511 such as, for example, 5 m/s (meter/second), 10 m/s, 15 m/s, 20 m/s, 25 m/s and 30 m/s to quantize a motion speed range of a normal human hand of 0 m/s-30 m/s.

Figure 6:
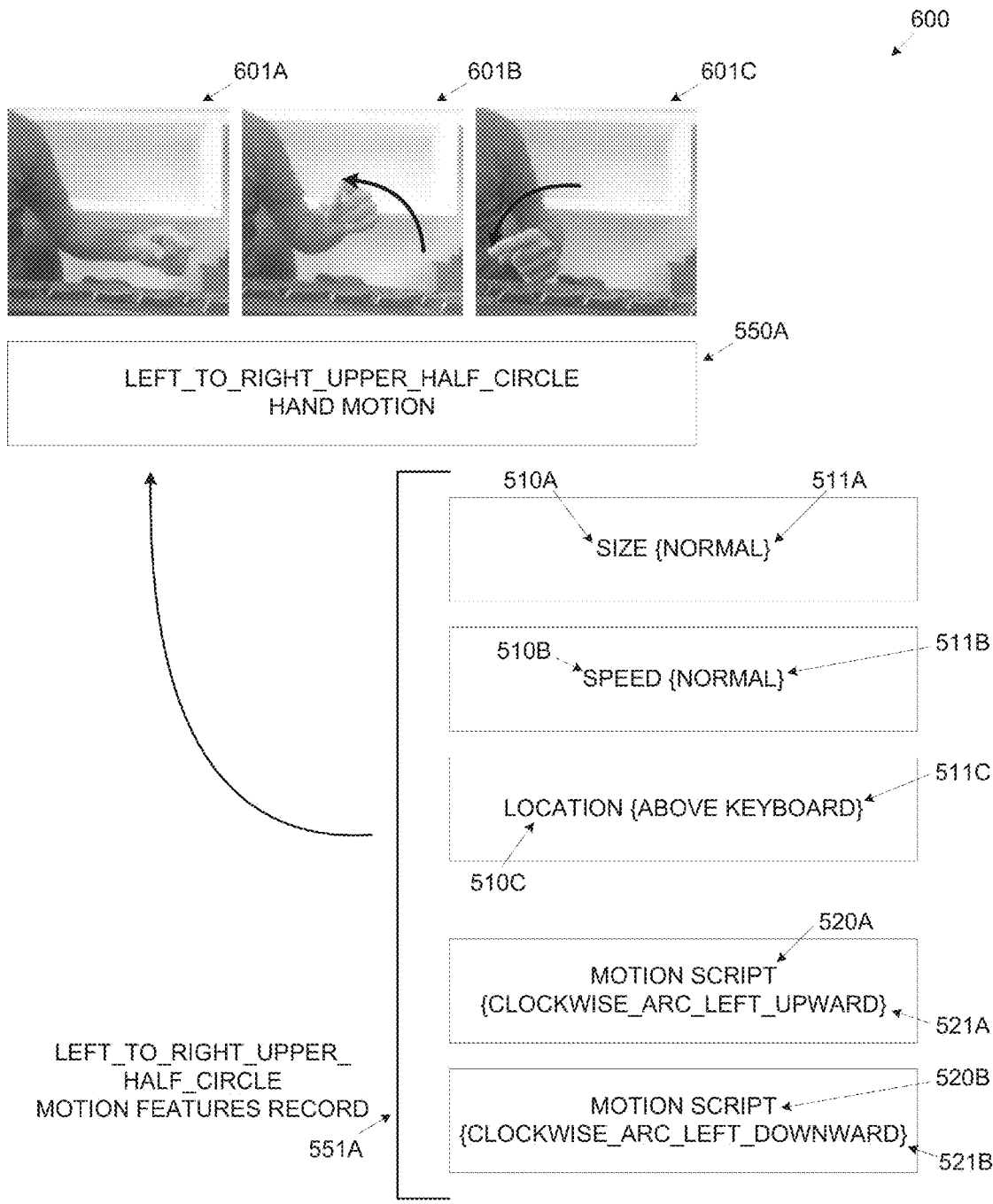
FIG. 6 is a schematic illustration of an exemplary half circle basic hand motion discrete representation, according to some embodiments of the present disclosure.

Reference is now made to FIG. 6 which is a schematic illustration of an exemplary half circle hand motion discrete representation, according to some embodiments of the present disclosure. Illustration 600 depicts an exemplary left_to_right_upper_half_circle hand motion 550A construction by a left_to_right_upper_half_circle motion features record 551A comprising discrete motion values such as the discrete motion values 511 and/or 521, each indicating a value of a corresponding hand motion feature such as the hand motion features 510 and/or 520. The left_to_right_upper_half circle hand motion 550A which is visualized through image captures 601A, 601B and 601C is created with some of the plurality of discrete motion values 511 and 521 as follows:

A motion size feature 510A is assigned a discrete motion value 511A to indicate the motion size is normal.

A motion speed feature 510B is assigned a discrete motion value 511B to indicate the motion speed is normal.

A motion location feature 510C is assigned a discrete motion value 511C to indicate the motion is performed above a keyboard.

A first motion script feature 520A is assigned a discrete motion value 521A to indicate a motion shape of clockwise arc_left_upward as presented by the image capture 601B.

A second motion script feature 520B is assigned a discrete motion value 521B to indicate a motion shape of clockwise_arc_left_downward as presented by the image capture 601C.

As seen above, the left_to_right_upper_half circle motion 550A is uniquely defined by a left_to_right_upper_half_circle motion features record 551A comprising of the discrete motion values 511A, 511B, 511C, 521A and 521B corresponding to the motion features 510A, 510B, 510C, 520A and 520B respectively. Similarly additional hand and/or finger(s) motion 550 may be defined.

The motion location feature 510C may be adapted for the environment and/or the purpose of the electrical device 101, for example, a laptop add-on electrical device, a car control unit, a home appliance control and the likes. The exemplary left_to_right_upper_half_circle hand motion 550A may relate to for example a computer aid electrical device such as the electrical device 101 in which the left_to_right_upper_half_circle hand motion 550A is performed by the user 150 above the keyboard. For other purposes and/or environments, a different one or more location reference objects may be used, for example, in case the electrical device 101 is used and/or integrated in a car, the one or more location reference objects may be, for example, a steering wheel, a gear stick and/or a dashboard.

Figure 7:
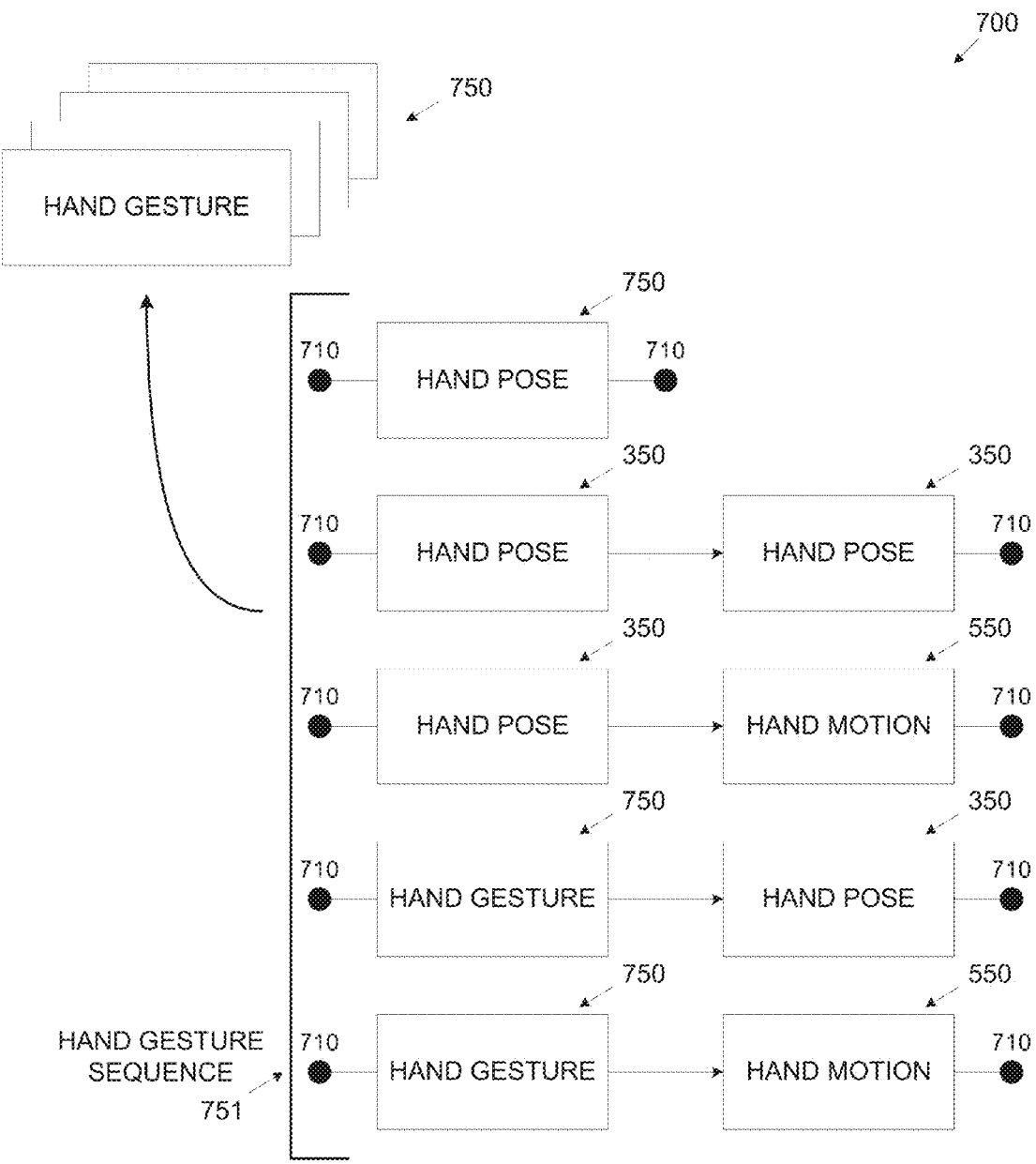
FIG. 7 is a block diagram of the building blocks of exemplary hand gestures, according to some embodiments of the present disclosure.

Reference is now made to FIG. 7 which is a block diagram of the building blocks of an exemplary hand gesture, according to some embodiments of the present disclosure.

Illustration 700 depicts several construction schemes of exemplary hand gestures 750. The hand gestures 750 may be created through one or more possible constructions, for example:

(a) The hand gesture 750 may consist of a hand pose 350.
(b) The hand gesture 750 may be a combination and/or sequence of two hand poses 350.
(c) The hand gesture 750 may be a combination and/or sequence of the hand pose 350 and a hand motion 550.
(d) The (first) hand gesture 750 may be a combination and/or sequence of a second hand gesture 750 and the hand pose 350. The second hand gesture may be the same gesture as the first one or it may be a different hand gesture 750.
(e) The (first) hand gesture 750 may be a combination and/or sequence of a second hand gesture 750 and the hand motion 550. The second hand gesture 750 may be the same gesture as the first one or it may be a different hand gesture 750.

The hand gesture 750 may be created through multiple iterations of the constructions (d) and/or (e) above. Each hand gesture 750 is constructed as a unique combination and/or sequence represented by a hand gesture sequence 201 which comprises of the one or more of hand poses 350, hand motions 550 and/or hand gestures 750. Each of the hand gestures 750 starts and ends with an idle state 710 which may be a virtual state identifying the start and/or the end of the unique hand gesture sequence 751 of the hand gesture 750. The hand gesture sequence 751 may be considered a sequential logic model describing the hand gesture 750.

Figure 8:
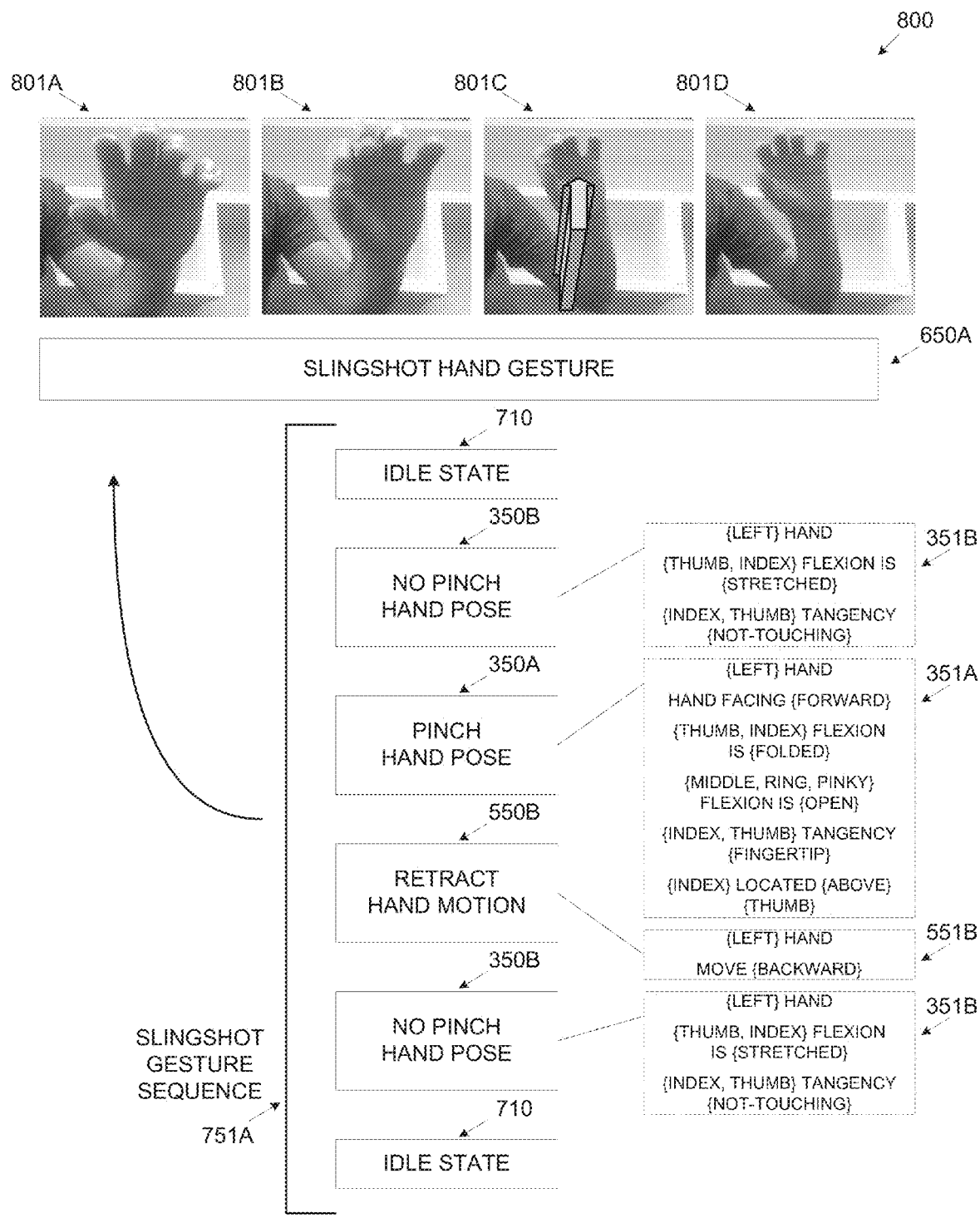
FIG. 8 is a block diagram of the building blocks of an exemplary slingshot hand gesture, according to some embodiments of the present disclosure.

Reference is now made to FIG. 8 which is a block diagram of the building blocks of an exemplary slingshot hand gesture, according to some embodiments of the present disclosure. Illustration 800 depicts an exemplary slingshot hand gesture 750A discrete representation as multiple hand poses such as the hand pose 350 and hand motions such as the hand motion 550. The slingshot hand gesture 750A which is visualized through image captures 801A, 801B, 801C and 801D is constructed of a combination and/or sequence of an idle state such as the virtual idle state 710, a no pinch hand pose 350B, a pinch hand pose such as the pinch hand pose 350A, a retract hand motion 550B and an end idle state such as the virtual idle state 710. The sequence of the slingshot hand gesture 750A is as follows:

A virtual idle state 710 defines the starting state and/or point of the sequence of the slingshot hand gesture 750A.
A no pinch hand pose 350B defined by a hand pose features record 351B represents no pinching action as depicted in image capture 801A.
A pinch hand pose 350A defined by the hand pose features record 351A in which a pinch action is identified as depicted in image capture 801B.
A retract hand motion 550B defined by a hand motion features record 551B in which the hand is moved backwards as is depicted in image capture 801C.
A no pinch hand pose 350B defined by the hand pose features record 351B represents the pinch pose is released and identified as no pinching action as depicted in image capture 801D.
An idle state 710 defines the end state and/or point of the sequence of the slingshot hand gesture 750A.

The sequence of the slingshot hand gesture 750A as described above is represented through a unique slingshot hand gesture sequence 751A which may be considered a sequential logic model associated with the slingshot hand gesture 750A. For each of the hand poses 350A, 350B and the hand motion 550B only relevant discrete pose and/or motion values may be defined. For example, the no pinch hand pose features record 351B is defined by the hand selection discrete pose value 311 (left), the finger flexion discrete pose value 321 (stretched) and the finger tangency discrete pose value 331 (not touching) are defined for the no pinch pose 350B. Other discrete pose values which are irrelevant to distinguishing between the no pinch hand pose 350B from the pinch hand pose 350A are left free and are not specified. Specifying only the relevant discrete pose and/or motion values allows for several degrees of freedom in the articulation of the hand poses 350 and/or hand motions 550 as performed by different one or more users 150 at runtime. This means that each of the one or more users 150 may perform the hand pose 350 and/or hand motion 550 slightly differently at runtime and yet they are still detected the same.

Figure 9:
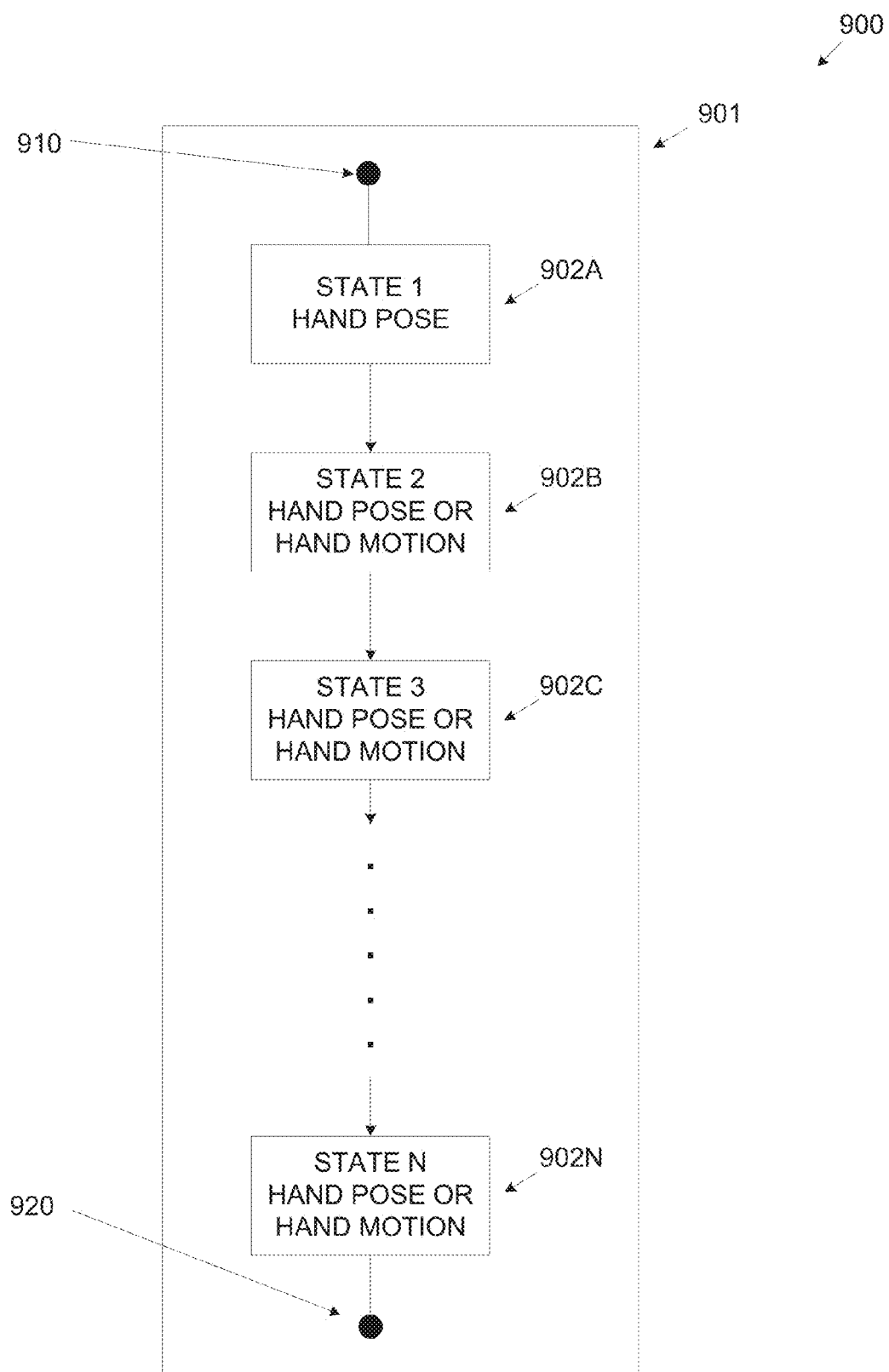
FIG. 9 is a schematic illustration of an exemplary FSM representing a hand gestures sequential logic model as a sequence of hand motions and hand poses, according to some embodiments of the present disclosure.

Reference is now made to FIG. 9 which is a schematic illustration of an exemplary FSM representing a hand gestures sequential logic model as a sequence of hand motions and hand poses, according to some embodiments of the present disclosure. An illustration 900 depicts an FSM 901 which may represent a sequential logic model of a hand gesture sequence such as the hand gesture sequence 751. The FSM 901 starts with a start point 910 indicating a starting state for the FSM 901. The FSM 901 may include one or more states 902A, 902B, 902C through 902N. The first state 902A is a hand pose such as the hand pose 350 which may describe a start of a sequence representing a hand gesture such as the hand gesture 750. Each of the succeeding states 902B, 902C through 902N may be either a hand pose 350 or a hand motion such as the hand motion 550. The FSM 901 is ended with an FSM end point 920. The start point 910 and/or the end point 920 may be defined as a virtual idle state such as the idle state 710. During detection process of the hand gesture 750, the FSM 901 may be converted to an HMM in order to allow processing one or more runtime hand datasets included in a runtime sequence depicting a moving hand of the user 150 compared to each of the hand poses 350 and/or hand motions 550. Each of the hand poses 350 and/or hand motions 550 is represented by a respective hand pose features record and a hand motion features record. Using the FSM 901 to represent each of the plurality of hand gesture sequences 901 each correlating to one of the hand gestures 910, allows to significantly simplify the estimation of the runtime sequence to detect it as one of pre-defined hand gestures such as the hand gestures 910 in runtime using dynamic programming by applying, for example, viterbi decoding over the HMM converted from the FSM 901.

The electrical device 101 may access a data storage unit such as the data storage unit 125 to retrieve a plurality of pre-defined hand gestures such as the hand gestures 750 each represented as a sequential logic model such as the hand gesture sequence 751 which may me represented by an FSM such as the FSM 901. Each of the hand gesture sequences 751 may map one or more hand poses such as the hand poses 350 and/or hand motions such as the hand motions 550 each represented by a unique one of a plurality of hand features records. Each of the hand features record may be a hand pose features record such as one of the hand pose feature vectors 351 or a hand motion features record such as one of the hand motion feature vectors 551. As described before each of the hand pose feature vectors 351 and hand motion feature vectors 551 is associated with the hand pose 350 and the hand motion 550 respectively. Each of the hand features records is defined by one or more of a plurality of discrete hand values each indicating a state of a respective hand feature which could be a pose feature or a motion feature. Similarly, the discrete hand values may be discrete pose values such as the discrete pose values 311, 321, 331 and/or 341 and/or discrete motion values such as the discrete motion values 511 and/or 521. As described before each of the discrete pose values 311, 321, 331 and/or 341 is indicative of a state of a corresponding hand pose features 310, 320, 330 and/or 340 while each of the discrete motion values 511 and/or 521 is indicative of a state of a corresponding hand motion features 510 and/or 520.

Reference is made once again to FIG. 2. As shown at 220, the first step of the hand gesture detection process 200 is to process the one or more received timed image(s) to generate a runtime sequence depicting the movements of the moving hand of the user 150, that includes one or more runtime hand datasets each defined by one or more of a plurality of discrete hand values scores which indicate a state of a respective hand feature of the moving hand depicted in the one or more timed images. The process for generating the one or more runtime hand datasets includes several steps during which various aspects of the one or more timed images are processed to classify the movements of the moving hand as the hand poses 350 and/or the hand motions 550. The goal of the classification process is to infer the plurality of discrete hand values scores from the timed image(s). The first step may be estimating a center of mass of the moving hand so as to place the hand within the 3D space presented by the one or more timed image(s). The center of mass is estimated by processing image data available in the timed image(s) from the one or more imaging device 160 and is represented in a 3-axes format (x, y, z). The image data available in the timed image(s) may include, for example depth data and/or IR data. According to the estimated center of mass, a relevant image segment(s) may be selected to be processed and avoid processing irrelevant image sections. Based on the image data available within the timed image(s), the image segment(s) may be further manipulated to remove elements which are irrelevant to the depicted hand, such as for example, background static elements (which may be identified through comparison of successive images) and/or pixels which are at a certain absolute and/or relative distance from the depicted hand where the distance may be set according to threshold value. Removing the irrelevant data from the image(s) which and/or reducing the image size to include only the relevant portion depicting the moving hand may later on improve the classification process as processing unnecessary image contents may be avoided. By improving the classification process, computation load and/or processing resources may be reduced. Following the estimation of the hand center of mass, the image segment (may also be referred to as patch) is positioned so as to be located in a pre-defined location appropriate for executing a statistical classification analyses of the succeeding steps of the classification process since the received timed image(s) should be compatible (with respect to location and/or position) with the training data used to train the classification functions (classifiers) which are employed in the following steps of the classification process. Optionally, the relevant image segment(s) is scaled so as to be at a pre-defined distance from the imaging device 160. Once again this may be required in order to place the image segment(s) in a pre-defined location appropriate for executing the statistical classification analyses of the succeeding steps of the classification process since the captured timed image(s) should be compatible (with respect to size and distance) with the training data used to train the classification functions which are employed in the following steps of the classification process.

Following identification of the center of mass of the moving hand, a fine tuning analysis is conducted on the relevant image segment(s) to estimate the center of hand of the moving hand. The center of hand is again defined in a 3-axes format (X, Y, Z) in the 3D space depicted by the timed image(s). Estimation of the center of hand may be performed through one or more statistical classification analyses, for example, regression analysis, SSVM functions, DFE and/or "long tree". During estimation of the center of the hand using DFE and/or "long tree" classifiers, a set of one or more trained hand center classifying functions is applied to the relevant image segment(s). Optionally, the hand position may be estimated using techniques other than center of mass and/or center of hand. Such techniques may include, for example, hand 3D volumetric modeling, hand 3D skeletal modeling, hand shape estimation, hand contour estimation and/or hand silhouette estimation. Optionally, the hand position used for analysis by the classification process succeeding steps is estimated according to an anatomical reference point other than the center of hand, for example, wrist joint and/or thumb-palm connecting joint.

After identifying the center of hand of the moving hand, a GOC is identified and estimated for the hand as depicted by the relevant image segment(s). The GOC represents the rotation state of the hand depicted in the image segment(s) within the 3D space. Since the 3D rotation may not be fully compensated for and/or taken into account with respect to the 2D plane of the imaging device 160 in a 2D space analysis, the actual 3D rotation must be first identified in order to select an appropriate set of classifying functions which is adapted to the selected GOC. The 3D rotation may be defined using, for example, Euler angles and/or Tait-Bryan angles relative to a pre-defined hand orientation. For example, a hand which is facing frontal to the imaging device 160 may be defined as a reference image with angles (0, 0, 0) while other hand orientation defined are define as the three rotation angles with respect to the reference image using, for example, a Tait-Bryan angles definition. Optionally the 3D rotation angles may not be estimated precisely, however it the estimation is sufficient to represent the hand orientation angles with discrete categories. This means that for different GOCs, different sets of classifying functions may be selected. Identifying and selecting the GOC may be performed through one or more statistical classifiers, for example, DFE and/or "long tree". Identification and selection of the GOC of the hand using the DFE and/or "long tree" classifiers is done using a set of one or more trained GOC classifying functions applied to the relevant image segment(s). After the GOC is selected an in-plane rotation is identified and selected. The in-plane rotation is identified and estimated using a set of a plurality of in-plane classifying functions (classifiers) which are adapted to the estimated specific GOC. The in-plane classifying functions, for example DFE and/or "long tree" classifiers are applied to the relevant image segment(s) to identify the rotation within the plane which is identified by the specific GOC. The in-plane rotation may be a continuous value however it is quantized to be represented by discrete values to be used by the in-plane classifying functions. The relevant image segment(s) is aligned in the 2D plane as identified in the previous step so that the hand is placed in a known state which may allow for simpler and/or more deterministic classification of a plurality of hand features later on during the classification process. The final step in the classification process is identifying the plurality of the discrete hand values scores for each of the one or more poses and/or motions of the moving hand depicted in the image segment(s). The aligned image segment(s) is processed by applying on it one or more of a plurality of feature classifying functions (classifiers), for example, DFE and/or "long tree" classifiers. Each of the plurality of feature classifying functions is associated with a hand feature, for example, hand location, palm direction, palm rotation, fingers flexion, fingers direction, fingers tangency, fingers relative location, motion property and/or motion script. Each of the plurality of hand features is estimated with a discrete hand value score indicating a state of the corresponding hand feature of the moving hand. Further detailed description of using DFE architecture for hand pose recognition is described in publication "Discriminative Ferns Ensemble for Hand Pose Recognition" by Eyal Krupka et al., whose disclosure is incorporated herein by reference. Optionally, the classifying functions used for, for example, the GOC selection, the in-plane rotation identification, the hand alignment setting and/or classification of the plurality of hand features (pose and motion) employ trained DTEs also referred to herein as "long trees". Further detailed description of creating, training and/or using "long tree" architecture for hand pose and/or motion recognition is described in US Application Patent Applications entitled "Structure and Training for Image Classification", whose disclosure is incorporated herein by reference. The result of this step is providing a runtime sequence of movements performed by the moving hand which includes one or more runtime hand datasets. Each of the runtime hand datasets is defined by a plurality of discrete hand values scores each indicating a current state of a respective hand feature of the moving hand of the user 150. Optionally, one or more of the classifying functions are processed in a dedicated hardware unit such as the vector processing unit 115.

As shown at 230, the second step for detecting hand gestures performed by the moving hand includes estimating and/or selecting an optimal one of the pre-defined hand gesture such as the hand gestures 750 which best matches the runtime sequence depicting the movements of the moving hand. Optionally, the hand gestures used to estimate the runtime sequence are not pre-defined but are rather combinations of one or more hand features records such as the hand pose features records 351 and/or the hand motion features records 551. The one or more runtime hand datasets included in the received runtime sequence depicting the moving hand of the user 150 are submitted to one or more SSVM functions together with the plurality of the pre-defined hand features records (the hand pose features records 351 and/or the hand motion features records 551). The one or more SSVM functions generate a plurality of estimation terms which will later be used for estimating the runtime sequence as one of the plurality of hand gestures 750.

Conventions and notations:
1) $x_t \in R^d$; $x_{1:t}=(x_1, \ldots, x_t)$
   $x_t$ is defined a set of discrete hand values scores for a specific runtime hand dataset at time t where each of the scores d corresponds to a particular hand feature, for example, index finger pointing forward, middle finger is touching the thumb, ring finger is folded and the likes. For brevity, the notation $x_{1:t}$ is used to describe $(x_1, \ldots, x_t)$.
2) $Y_t \in Y_t$; $y_{1:t}=(y_1, \ldots, y_t)$
   $y_t$ is defined a set of pre-defined hand features records (hand pose features records 351 and/or hand motion features records 551) associated with a specific hand gesture which is part of the pre-defined hand gestures set $Y_t$ that is valid at time t. For brevity, the notation $y_{1:t}$ is used to describe $(y_1, \ldots, y_t)$.

The estimation terms include singleton terms and pairwise terms. The singleton terms relate to estimation terms in which each of the runtime hand datasets is simulated by the plurality of discrete hand values of the valid pre-defined hand features records (each defining one of the hand poses 350 and/or hand motions 550 included in the valid hand gestures 750). Calculation of the singleton terms is expressed in equation 1 below.

$$S(x_{1:T}, y_t) = \langle w_s, F_s(x_{1:t}, y_t) \rangle; \ w_s \in R^{D_s} \quad \text{Equation 1:}$$

Where $S(x_{1:T}, y_t)$ is a set of singleton terms, $F_s(x_{1:t}, y_t)$ is a set of singleton features and $w_s$ is a set of weights assigned to each of the singleton features. The set of singleton terms as well as the set of weights $w_s$ may be created through a training session using the one or more SSVM functions to select singleton terms and weights that provide the best accuracy for the associated set of pre-defined hand features records.

The pairwise estimation terms relate to estimation terms in which each of the runtime hand datasets is simulated by the plurality of discrete hand values of a current pre-defined hand features record and a predecessor pre-defined hand features record of the valid pre-defined hand features records (each defining one of the hand poses 350 and/or hand motions 550 included in the valid hand gestures 750). Calculation of the pairwise terms is expressed in equation 2 below.

$$P(x_{1:T}, y_{t-1}, y_t) = \langle w_p, F_p(x_{1:t}, y_{t-1}, y_t) \rangle; \ w_p \in R^{D_p} \quad \text{Equation 2:}$$

Where $P(x_{1:T}, y_{t-1}, y_t)$ is a set of pairwise terms, $F_p(x_{1:t}, y_{t-1}, y_t)$ is a set of pairwise features and $w_p$ is a set of weights assigned to each of the pairwise features. The set of pairwise terms as well as the set of weights $w_p$ may be created through a training session using the one or more SSVM functions to select pairwise terms and weights that provide the best accuracy for the associated set of pre-defined hand features records.

The sets of singleton features and the sets of the pairwise features are created by simulation of the discrete hand values defining the hand features records of the valid hand gestures 750 over the discrete hand values scores of the runtime hand datasets. The discrete hand values may be expressed in a Boolean form, for example, "(index finger is pointing up OR index finger is pointing right) AND (ring finger is touching the thumb)". Following this process the entire hand features record is represented by Boolean expressions. The Boolean expression may allow for efficient and/or simple simulation. The Boolean representation may take many forms however the one that presents best results may be, for example, CNF. CNF is a Boolean representation in which every Boolean expression may be expressed as AND operators over two or more OR operators, for example, "(palm facing forward OR palm facing upward OR palm facing LEFT) AND (index finger touching thumb OR middle finger touching thumb)". Simulating the discrete hand values defining the hand features records over the discrete hand values scores of the runtime hand datasets is performed using one or more of a plurality of parametric functions in which one or more parameters are used to achieve best simulation results. The generation of the singleton features is given in equations 3 below.

$$F_s(x_{1:t}, y_t) = \begin{bmatrix} \alpha(x_t, y_t; \rho_1) \\ \vdots \\ \alpha(x_t, y_t; \rho_{D_s}) \end{bmatrix} \quad \text{Equation 3}$$

Where $\alpha(x_t, y_t; \rho)$ is a set of parametric functions. A parametric function that provides the singleton feature presenting the best accuracy is selected from the set of parametric functions. The set parametric functions is executed at runtime since the parameter $\rho$ which provides best accuracy results for the hand gesture detection process 200 may not be known in advance. The execution of the parametric functions for each of the singleton features may be performed using the one or more SSVM functions.

Similarly generation of the pairwise features is given in equations 4 below.

$$F_p(x_{1:t}, y_{t-1}, y_t) = \begin{bmatrix} \beta(x_t, y_{t-1}, y_t; \sigma_1) \\ \vdots \\ \beta(x_t, y_{t-1}, y_t; \sigma_{D_p}) \end{bmatrix} \quad \text{Equation 4}$$

Where $\beta(x_t, y_t; \sigma)$ is a set of parametric functions. A parametric function that provides the pairwise feature presenting the best accuracy is selected from the set of parametric functions. The set parametric functions is executed at runtime since the parameter $\sigma$ which provides best accuracy results for the hand gesture detection process 200 may not be known in advance. The execution of the parametric functions for each of the pairwise features may be performed using the one or more SSVM functions.

The hand gesture detection process 200 proceeds to perform an optimization process over one or more score functions which use the generated estimation terms (singleton terms and/or pairwise terms) to select a pre-defined hand gesture 750 that best fits the runtime sequence of the one or more runtime hand datasets. The score function is optimized by applying it to one or more sequences within an FSM such as the FSM 901, where each of the one or more sequences corresponds to one of the hand gestures 750. The score function is expressed in equation 5 below.

$$\max_{y_{1:T}} H(x_{1:T}, y_{1:T}) = \sum_{t=1}^{T} S(x_{1:T}, y_t) + \sum_{t=2}^{T} P(x_{1:T}, y_{t-1}, y_t) \quad \text{Equation 5}$$

Where the term $$\max_{y_{1:T}} H(x_{1:T}, y_{1:T})$$

represents the hand gesture 750 which matches most optimally the runtime sequence depicting the moving hand of the user 150 at time t. The optimization may be done through dynamic programming employing, for example, viterbi decoding over an FSM such as the FSM 901 of each of the one or more of the plurality of valid hand gestures 750 after augmenting the FSM 901 with one or more of the score functions over one or more sequences within the FSM 901. Optionally, the set of valid hand gestures 750 at the time t includes one or more hand gestures 750 which are not pre-defined but rather consisting one or more hand poses such as the hand poses 350 and/or hand motions such as the hand motions 260 which may be represented using the discrete hand values.

Optionally, the one or more SSVM functions are specialized by selecting the set of valid pre-defined hand gestures 750 at the time t to include only one or more registered hand gestures of the hand gestures 750. The one or more registered hand gestures 750 may be considered valid with respect to a context of the runtime environment of the user 150. The context may describe one or more runtime execution parameters and/or conditions at the time t such as, for example, active application, user interaction state and/or limitation of hand gestures 750 available to the user 150 at the time t. Specializing the one or more SSVM functions may further accelerate the optimization process to allow for a more rapid hand gesture detection process 200. Optionally, one or more of the SSVM functions are processed in a dedicated hardware unit such as the vector processing unit 115.

As shown at 240, following step 230 of the process 200, once the one or more hand gestures performed by the user 150 as depicted in the timed image(s) are estimated, one or more actions, operations and/or commands may be initiated to a controlled unit such as the controlled unit 170. The one or more actions, operations and/or commands are associated with the detected one or more hand gestures 750 which are identified at step 230. Optionally, a high level indication may be provided to a host apparatus indicating the detected one or more hand gestures 750 that were estimated in step 230.

Optionally, the process 200 includes detection of one or more transitions with the FSM 901 of the one or more hand gestures 750. The detected transition(s) may be used for one or more of a plurality of purposes, for example, logging partial hand gestures of the user 150, providing feedback to the user 150 based on the partial hand gestures, initiating one or more actions, operations and/or commands following detection of a partial hand gesture of the user 150 and the likes.

Some embodiments of the present disclosure are provided through examples with reference to the accompanying drawings. However, this invention may be embodied in many different forms and should not be construed as limited to any specific structure or function presented herein.

A first example may be a smart home application in which one or more of a plurality of smart home elements, for example, appliances and/or systems is controlled by a hand gesture detection electrical device such as the electrical device 101. One or more electrical devices 101 may be installed in a location which is equipped with one or more smart control infrastructures (smart home), for example, lighting systems, shades and/or air conditioning (AC) systems. The electrical device(s) 101 may be connected to one or more imaging units such as the imaging unit 160 and to the smart home infrastructure(s) which are performing as a controlled unit such as the controlled unit 170. The electrical device(s) 101 may perform a hand gesture detection process such as the hand gesture detection process 200 to detect one or more pre-defined hand gestures such as the hand gestures 750 by analyzing one or more timed image(s) received from the imaging unit 160 monitoring hand movement of a use such as the user 150. One or more actions, commands and/or operations may be associated with one or more of the hand gestures. At the detection of one or more of the pre-defined hand gestures 750, the electrical device(s) 101 may initiate the associated one or more commands to the controlled unit 170 to control operation of one or more of the smart home elements. One or more of the pre-defined hand gestures 750 may be assigned to, for example, turning light(s) ON/OFF, adjusting a light level (dimmer) of the light(s), turning AC system ON/OFF and/or setting a temperature level of the AC system. Another exemplary application may be adjusting an audio output volume for an electrical appliance such as, for example, a television set (TV), a multimedia system, a radio receiver and/or a stereo system. Optionally, the electrical device is connected to a control unit of the smart home and transmits high level indication of the detected hand gestures 750 to the control unit. The control unit in turn may initiate one or more of the commands, actions and/or operations which are associated with the indicated one or more hand gestures 750 to control one or more of the smart home elements.

A second example may be a smart car application in which one or more of a plurality of smart car elements, for example, appliances and/or systems is controlled by a hand gesture detection electrical device such as the electrical device 101. One or more electrical devices 101 may be installed in a car which is equipped with one or more smart control infrastructures (smart car), for example, lighting systems, multimedia systems and/or air conditioning (AC) systems. The electrical device(s) 101 may be connected to one or more imaging units such as the imaging unit 160 and to the smart car infrastructure(s) performing as a controlled unit such as the controlled unit 170. The electrical device(s) 101 may perform a hand gesture detection process such as the hand gesture detection process 200 to detect one or more pre-defined hand gestures such as the hand gestures 750 by analyzing one or more timed image(s) received from the imaging unit 160 monitoring hand movement of a use such as the user 150. One or more actions, commands and/or operations may be associated with one or more of the hand gestures. At the detection of one or more of the pre-defined hand gestures 750, the electrical device(s) 101 may initiate the associated one or more commands to the controlled unit 170 to control operation of one or more of the smart car elements. One or more of the pre-defined hand gestures 750 may be assigned to, for example, turning light(s) ON/OFF, adjusting a light level (dimmer) of the light(s), turning AC system ON/OFF, setting a temperature level of the AC system and/or adjusting the audio output volume for the multimedia system and/or the radio receiver. Optionally, the electrical device is connected to a control unit of the smart car and transmits high level indication of the detected hand gestures 750 to the control unit. The control unit in turn may initiate one or more of the commands, actions and/or operations which are associated with the indicated one or more hand gestures 750 to control one or more of the smart car elements.

A third example may be a smart microwave oven which is integrated with a hand gesture detection electrical device such as the hand gesture detection electrical device 101. The hand gesture detection electrical devices 101 may adapted to identify one or more pre-defined hand gestures such as the hand gestures 750 which are associated with one or more actions, commands and/or operations to operate the microwave oven.

Figure 10:
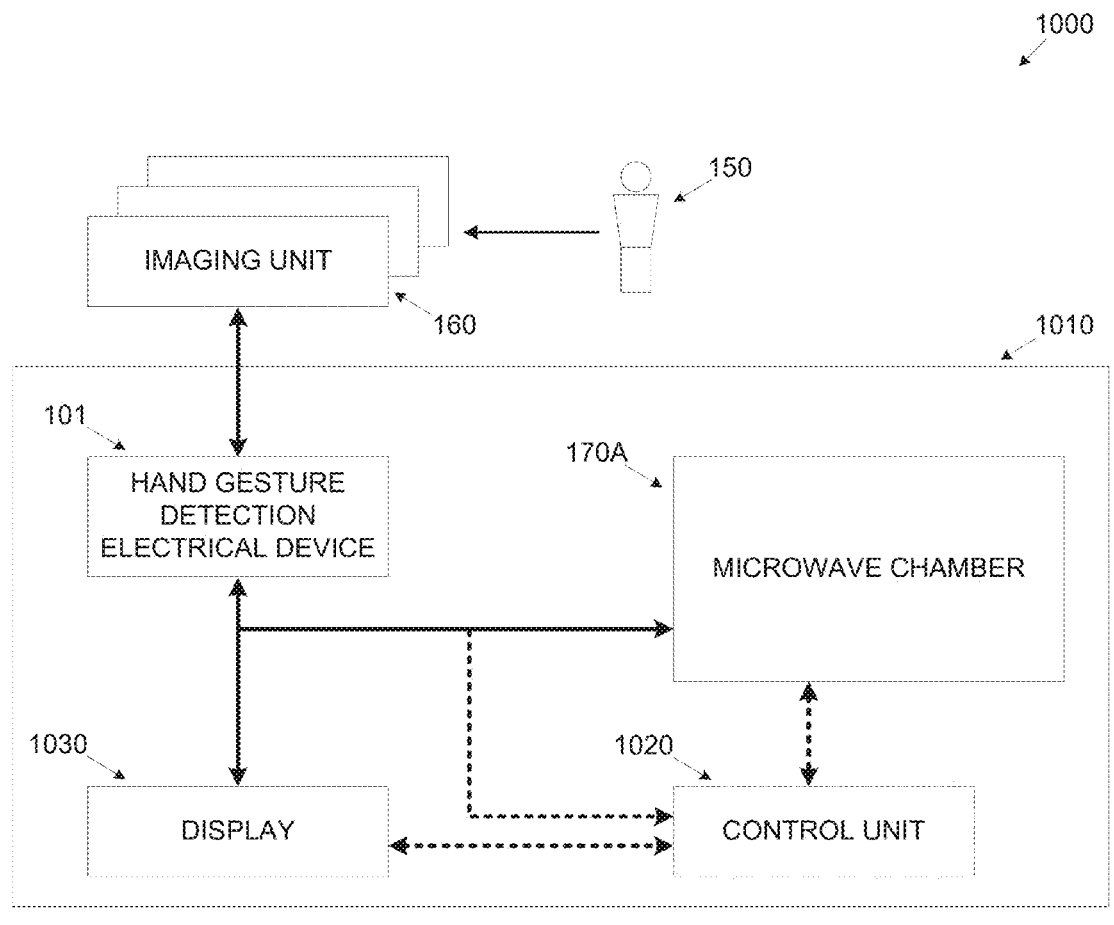
FIG. 10 is a schematic illustration of an exemplary microwave oven integrating an exemplary hand gestures detection electrical device, according to some embodiments of the present disclosure.
Figure 10:
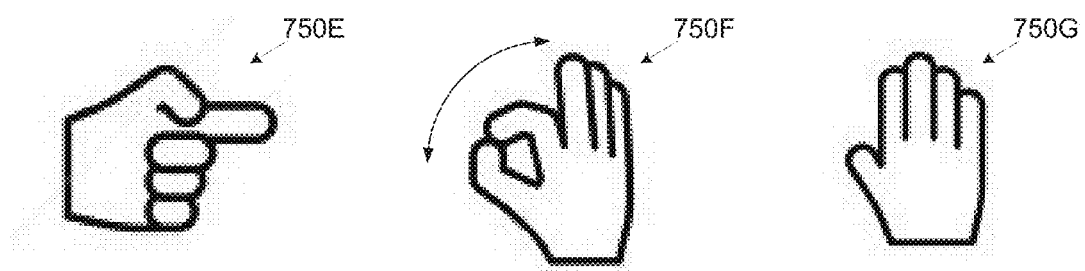

Reference is now made to FIG. 10 which is a schematic illustration of an exemplary microwave oven integrating an exemplary hand gestures detection electrical device, according to some embodiments of the present disclosure. Illustration 1000 presents an exemplary microwave oven 1010 which integrates a hand gesture detection electrical device such as the electrical device 101, a microwave chamber 170A and a display 1030 for example, a liquid crystal display (LCD) and/or one or more seven segments arrays. The microwave chamber 170A is a controlled unit such as the controlled unit 170. The electrical device 101 may connect to one or more imaging units such as the imaging unit 160 to monitor hand movement of a use such as the user 150. The electrical device 101 may perform a hand gesture detection process such as the hand gesture detection process 200 to detect one or more pre-defined hand gestures such as the hand gestures 750 which are associated with one or more actions, commands and/or operations to control the operation of the microwave oven 1010. The one or more pre-defined hand gestures 750 to control the microwave oven 1010 may include, for example, a cock start command as illustrated by an exemplary hand gesture 750E, a cooking time adjustment command as illustrated by an exemplary hand gesture 750F and/or a cock stop command as illustrated by an exemplary hand gesture 750G. The electrical device 101 may present the current operation and/or commands associated with the detected one or roe hand gestures 750 on the display 1030 to allow for interaction with the user 150. At detection of the hand gesture 750E, the electrical device 101 may turn ON the microwave chamber 170A. At detection of the hand gesture 750F, the electrical device 101 may initiate a cooking time interaction with the user 150. The hand gesture 750F may be, for example, a knob turning hand gesture in which turning an imaginary knob clockwise will increase the cooking time period while turning the imaginary knob counterclockwise will decrease the cooking time period. The cooking time interval selected by the user 150 may be presented on the display 1030. At the end of the interaction with the user 150, the electrical device 101 may save the selected cooking time period. Optionally, transitions within an FSM such as the FSM 901 representing the hand gestures 750E, 750F and/or 750G are detected as partial hand gestures to initiate actions, operations and/or command within the microwave oven 1010. For example, once the electrical device 101 of the microwave oven 1010 detects that the user 150 articulates the knob turning gesture 750F, an illustration of a scaled knob may be presented on the display 1030 to visualize to the user 150 the knob turning operation and/or a cooking time value. The displayed illustrated knob may further be turned in the direction detected from the hand movements of the user 150. After cooking is started and the microwave chamber 170A is turned ON, the electrical device 101 may wait for the selected cooking time period and at the end of the selected cooking time period the electrical device 101 turns the microwave chamber 170A OFF. At detection of the hand gesture 750G, the electrical device 101 may turn OFF the microwave chamber 1020. Optionally one or more of the imaging units 160 are integrated in the microwave oven 1010. Optionally, the microwave oven 1010 includes a control unit 1020 which controls operation of the microwave chamber 170A and/or the display 1030. The electrical device 101 may transmit to the control unit 1020 high level indications, for example, a message indicating one or more of the hand gestures 750 which are detected by the electrical device 101 in the one or more timed images. The control unit 1020 may control the microwave chamber 170A and/or the display 1030 according to the hand gestures 750 indications received from the electrical device 101.

It is expected that during the life of a patent maturing from this application many relevant DFE, DTE, HMI and/or NUI will be developed and the scope of the term DFE, DTE, HMI and/or NUI is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "hand gesture" or "at least hand gesture" may include a single hand gesture and/or two hands gestures.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to some embodiments of the present disclosure there is provided a hand gesture detection electrical device for detecting hand gestures, comprising an IC electronically integrating the following a first interface connecting to one or more imaging devices, a second interface connecting to a controlled unit, a data storage, a memory storing a code and one or more processors coupled to the first interface, the second interface, the data storage and the memory for executing the stored code. The data storage stores a plurality of sequential logic models each representing one of a plurality of hand gestures. The sequential logic models map pre-defined sequences of one or more pre-defined hand poses and pre-defined hand motions. The code comprising:
  a) Code instructions to receive one or more of a plurality of timed images depicting a moving hand of a user.
  b) Code instructions to generate a runtime sequence mapping one or more of a plurality of runtime hand datasets each defined by a plurality of discrete hand values indicating a current state of the moving hand.
  c) Code instructions to estimate which one of the plurality of hand gestures best matches the runtime sequence through optimization of the runtime sequence compared to each of the plurality of sequential logic models using one or more SSVM functions.
  d) Code instructions to initiate one or more actions to the controlled unit. The one or more actions are associated with selected one or more of the plurality of hand gestures. The selection is based on the estimation.

Each of the plurality of pre-defined hand poses and hand motions is represented by one of a plurality of pre-defined hand features records each defined by at least some of a plurality of discrete hand values each indicating a state of a respective one of a plurality of hand features of a reference hand.

Each of the plurality of runtime hand datasets is defined by at least some of a plurality of discrete hand values scores each indicating a current state of a respective one of the plurality of hand features of the moving hand. The plurality of discrete hand values scores is inferred by the code instructions by analyzing the one or more timed images.

Each one of the plurality of discrete hand values is represented by a Boolean formula which is defined in the form of a CNF.

The hand gestures detection electrical device is, for example, an IC, an application specific integrated circuit (ASIC), a system on chip (SOC) and/or an intellectual property (IP) module. The IP module is integrated in another IC.

The one or more imaging device is, for example, a camera, an infrared (IR) camera, a stereo camera and/or a depth camera.

Optionally, the first interface utilizes one or more interconnecting mediums, for example, IC internal interconnects, printed circuit board (PCB) traces, wired connectivity and/or wireless connectivity.

Optionally, the second interface utilizes one or more interconnecting mediums, for example, IC internal interconnects, printed circuit board (PCB) traces, wired connectivity and/or wireless connectivity.

Optionally, the one or more imaging device is integrated in the hand gesture detection electrical device.

Optionally, one or more of the data storage and/or the memory are utilized by one or more external devices and not integrated in the hand gesture detection electrical device.

Optionally, the one or more SSVM functions is executed by a dedicated electrical circuit integrated in the hand gesture detection electrical device.

Optionally, the code includes code instructions to transmit an indication of the selected one or more hand gestures to a host apparatus connected to the hand gestures detection electrical device through one or more of the first interface and/or the second interface.

Optionally, the code comprises code instructions to manipulate the one or more timed image to remove one or more non-relevant image portions.

Optionally, the code comprises code instructions to scale the moving hand depicted in the one or more timed images.

The code instructions apply a plurality of hand feature classifying functions on the one or more timed images. Each of the plurality of hand feature classifying functions outputs a current discrete hand value score of a respective one of a plurality of hand features of said moving hand. The plurality of hand feature classifying functions is trained statistical classifiers.

Optionally, the code comprises code instructions to identify an in-plane rotation of the moving hand. The in-plane rotation is identified by applying a plurality of in-plane rotation classifying functions on the one or more timed images. The plurality of in-plane rotation classifying functions is selected according to a selected GOC of the moving hand.

The plurality of in-plane rotation classifying functions is trained statistical classifiers.

The GOC is selected by applying a plurality of GOC classifying functions on one or more timed images. The plurality of GOC classifying functions are trained statistical classifiers.

Optionally, the code comprises code instructions to align the moving hand depicted in the one or more timed images after identifying the in-plane rotation.

Optionally, the code comprises code instructions to identify a center of hand of the moving hand prior to selecting the GOC. The center of hand is derived from a center of mass of the moving hand. The center of mass is identified by analyzing an image data available from one or more images depicting the moving hand.

The center of hand is identified by applying a plurality of center of hand classifying functions on the one or more timed images. The plurality of center of hand classifying functions is trained statistical classifiers.

Optionally, the sequential logic model is represented as an FSM. Each state of the FSM correlates to a respective one of the plurality of pre-defined hand features records.

Optionally, the code comprises code instructions to augment the FSM with one or more score functions over one or more sequences in the FSM prior to the optimization.

Optionally, one or more transition within the FSM is detected. The one or more transitions are logged by the hand gestures detection electrical device.

Optionally, detection of the one or more transitions initiates one or more actions to the controlled unit. The one or more actions are associated with the one or more transitions.

Optionally, the one or more SSVM functions are specialized by selecting the sequential logic model of one or more context registered hand gestures from the plurality of hand gestures.

Optionally, each one of the plurality of runtime hand datasets is estimated as one of the plurality of hand poses and/or hand motions which are not pre-defined.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those element.

What is claimed is:

1. A hand gesture detection electrical device for detecting hand gestures, comprising:
   an integrated circuit (IC) electronically integrating the following:
   a first interface configured to connect at least one imaging device;
   a second interface configured to connect to a controlled unit;
   a data storage configured to store a plurality of sequential logic models each representing one of a plurality of hand gestures, each of said sequential logic models comprises a pre-defined ordered sequence of at least one of a plurality of pre-defined hand poses and pre-defined hand motions, wherein each of said plurality of pre-defined hand poses and each of said plurality of pre-defined hand motions is represented by one of a plurality of pre-defined hand features records;
   a memory storing a code; and
   at least one processor configured to be coupled to said first interface, said second interface, said data storage and said memory, the at least one processor is configured to execute said stored code, said code comprising:
   code instructions to receive at least one of a plurality of timed images depicting a moving hand of a user;
   code instructions to generate a runtime sequence of at least one of a plurality of runtime hand datasets, said runtime sequence representing said moving hand;
   code instructions to match each of said at least one of said plurality of runtime hand datasets with a respective one of said plurality of pre-defined hand features records in a respective position in a sequence of each of said plurality of sequential logic models;
   code instructions to estimate which one of said plurality of hand gestures best matches said runtime sequence; and
   code instructions to initiate at least one action to said controlled unit, said at least one action is associated with a selected at least one of said plurality of hand gestures, said selection is based on said estimation;
   wherein each of said plurality of pre-defined hand poses depicts a static posture of a reference hand and wherein each of said plurality of pre-defined hand motions depicts a movement of said reference hand.

2. The hand gestures detection electrical device of claim 1, wherein the estimation of which one of said plurality of hand gestures best matches said runtime sequence is done through an optimization of said matching, using at least one score function.

3. The hand gestures detection electrical device of claim 2, further comprising said at least one score function is executed by a dedicated electrical circuit integrated in said hand gesture detection electrical device.

4. The hand gestures detection electrical device of claim 1, wherein said hand gestures detection electrical device is a member selected from a group consisting of: IC, application specific integrated circuit (ASIC), system on chip (SOC) and an intellectual property (IP) module, said IP module is integrated in another IC.

5. The hand gestures detection electrical device of claim 1, further comprising said first interface utilizes at least one interconnecting medium, said at least one interconnecting medium is a member selected of a group consisting of: IC internal interconnects, printed circuit board (PCB) traces, wired connectivity and wireless connectivity.

6. The hand gestures detection electrical device of claim 1, further comprising said second interface utilizes at least one interconnecting medium, said at least one interconnecting medium is a member selected of a group consisting of: IC internal interconnects, printed circuit board (PCB) traces, wired connectivity, wireless connectivity.

7. The hand gestures detection electrical device of claim 1, further comprising said at least one imaging device is integrated in said hand gesture detection electrical device.

8. The hand gestures detection electrical device of claim 1, wherein said code further comprising code instructions to transmit an indication of said selected at least one hand gesture to a host apparatus connected to said hand gestures detection electrical device through at least one of: said first interface and said second interface.

9. The hand gestures detection electrical device of claim 1, wherein:
   each of said -plurality of pre-defined hand features records -is defined by at least some of a plurality of discrete hand values each indicating a state of a respective one of a plurality of hand features of -said reference hand; and
   each one of said plurality of runtime hand datasets is defined by at least some of a plurality of discrete hand values scores each indicating a current state of a respective one of said plurality of hand features of said moving hand, said plurality of discrete hand values scores is inferred by said code instruction by analyzing said at least one timed image.

10. The hand gestures detection electrical device of claim 1, wherein said code instructions apply a plurality of hand feature classifying functions on said at least one timed image, each of said plurality of hand feature classifying functions outputs a current discrete hand value score of a respective one of a plurality of hand features of said moving hand;
wherein said plurality of hand feature classifying functions are trained statistical classifiers.

11. The hand gestures detection electrical device of claim 1, wherein said code further comprising code instructions to identify an in-plane rotation of said moving hand, said in-plane rotation is identified by applying a plurality of in-plane rotation classifying functions on said at least one timed image, said plurality of in-plane rotation classifying functions is selected according to a selected global orientation category (GOC) of said moving hand and wherein said code further comprising code instructions to align said moving hand depicted in said at least one timed image after identifying said in-plane rotation.

12. The hand gestures detection electrical device of claim 11, wherein said GOC is selected by applying a plurality of GOC classifying functions on at least one timed image, said plurality of GOC classifying functions are trained statistical classifiers.

13. The hand gestures detection electrical device of claim 11, wherein said plurality of in-plane rotation classifying functions are trained statistical classifiers.

14. The hand gestures detection electrical device of claim 11, wherein said code further comprising code instructions to identify a center of hand of said moving hand prior to selecting said GOC, said center of hand is derived from a center of mass of said moving hand, said center of mass is identified by analyzing an image data available from at least one image depicting said moving hand.

15. The hand gestures detection electrical device of claim 14, wherein said code instructions to identify said center of hand apply a plurality of center of hand classifying functions on said at least one timed image, said plurality of center of hand classifying functions are trained statistical classifiers.

16. The hand gestures detection electrical device of claim 1, further comprising said sequential logic model is represented as a finite state machine (FSM), each state of said FSM correlates to a respective one of said plurality of pre-defined hand features records, wherein said code further comprising code instructions to augment the FSM with at least one score function over at least one sequence within said FSM.

17. The hand gestures detection electrical device of claim 16, further comprising detecting at least one transition within said FSM, said at least one transition is logged by said hand gestures detection electrical device.

18. The hand gestures detection electrical device of claim 17, further comprising said detection of said at least one transition initiates at least one action to said controlled unit, said at least one action is associated with said at least one transition.

19. The hand gestures detection electrical device of claim 1, further comprising each one of said plurality of runtime hand datasets is estimated as one of a plurality of: hand poses and a hand motions which are not pre-defined.

20. A method for detecting hand gestures, comprising:
providing an integrated circuit (IC) electronically integrating a first interface configured to connect at least one imaging device, a second interface configured to connect to a controlled unit, and a data storage configured to store a plurality of sequential logic models each representing one of a plurality of hand gestures, each of said sequential logic models comprises a pre-defined ordered sequence of at least one of a plurality of pre-defined hand poses and pre-defined hand motions, wherein each of said plurality of pre-defined hand poses and each of said plurality of pre-defined hand motions is represented by one of a plurality of pre-defined hand features records;
using the IC for:
receiving at least one of a plurality of timed images depicting a moving hand of a user;
generating a runtime sequence of at least one of a plurality of runtime hand datasets, said runtime sequence representing said moving hand;
matching each of said at least one of said plurality of runtime hand datasets with a respective one of said plurality of pre-defined hand features records in a respective position in a sequence of each of said plurality of sequential logic models;
estimating which one of said plurality of hand gestures best matches said runtime sequence; and
initiating at least one action to said controlled unit, said at least one action is associated with a selected at least one of said plurality of hand gestures, said selection is based on said estimation;
wherein each of said plurality of pre-defined hand poses depicts a static posture of a reference hand and wherein each of said plurality of pre-defined hand motions depicts a movement of said reference hand.

\* \* \* \* \*